(12) United States Patent
Lantz

(10) Patent No.: US 11,229,321 B2
(45) Date of Patent: Jan. 25, 2022

(54) CHARCOAL IGNITER WITH BOTTOM RELEASE GRATE

(71) Applicant: Aron J. Lantz, Williamsport, PA (US)

(72) Inventor: Aron J. Lantz, Williamsport, PA (US)

( * ) Notice: Subject to any disclaimer, the term of this patent is extended or adjusted under 35 U.S.C. 154(b) by 731 days.

(21) Appl. No.: 15/896,003

(22) Filed: Feb. 13, 2018

(65) Prior Publication Data

US 2018/0168396 A1 Jun. 21, 2018

Related U.S. Application Data

(63) Continuation-in-part of application No. 15/365,494, filed on Nov. 30, 2016, now Pat. No. 10,653,273.

(60) Provisional application No. 62/459,059, filed on Feb. 15, 2017, provisional application No. 62/261,857, filed on Dec. 2, 2015.

(51) Int. Cl.
*A47J 37/07* (2006.01)

(52) U.S. Cl.
CPC ......... *A47J 37/079* (2013.01); *A47J 37/0763* (2013.01)

(58) Field of Classification Search
CPC ................................ A47J 37/07; A47J 37/079
USPC ........................................................ 126/25 B
See application file for complete search history.

(56) References Cited

U.S. PATENT DOCUMENTS

| | | | |
|---|---|---|---|
| 4,417,565 A | 11/1983 | Karpinia | |
| 4,909,237 A * | 3/1990 | Karpinia | ................ A47J 37/079 |
| | | | 126/25 B |
| 5,469,835 A | 11/1995 | Stephen et al. | |
| 10,426,293 B2 * | 10/2019 | Van Der Westhuizen | .................... |
| | | | A47J 37/07 |
| 2004/0154603 A1 * | 8/2004 | Crawford | ............... A47J 37/079 |
| | | | 126/25 R |
| 2008/0073356 A1 * | 3/2008 | Sulosky | ............... A47J 37/1204 |
| | | | 220/573.1 |

(Continued)

FOREIGN PATENT DOCUMENTS

| | | | | | |
|---|---|---|---|---|---|
| CA | | 2818134 A1 * | 11/2014 | ............ | A47J 37/079 |
| DE | 102006027862 A1 * | | 12/2007 | .............. | F23B 20/00 |
| KR | | 200476906 Y1 * | 4/2015 | | |

OTHER PUBLICATIONS

KR-200476906-Y1 Abstract Translated.*

*Primary Examiner* — Steven B McAllister
*Assistant Examiner* — Aaron H Heyamoto

(57) ABSTRACT

A charcoal igniter and food cooker, including an upper section such that the upper section includes a first conical section having a distal end and a proximal end such that the proximal end of the first conical section includes a first conical section opening, a fire chamber having a distal end and a proximal end such that a releasable grate is located adjacent to the distal end of the fire chamber and the distal end of the first conical section is located adjacent to the proximal end of the fire chamber, wherein an amount of charcoal to be ignited is located within the fire chamber and adjacent to the releasable grate; and a stationary lower section such that the upper section is retained within the stationary lower section, wherein the stationary lower section includes a second conical section having a distal end and a proximal end such that the proximal end of the second conical section is located adjacent to the upper section and the distal end of the second conical section includes a second conical section opening, wherein the first and second conical openings have a diameter that is larger than a diameter of the fire chamber.

3 Claims, 25 Drawing Sheets

(56) References Cited

U.S. PATENT DOCUMENTS

2015/0040886 A1* 2/2015 Phelps .................. A47J 37/079
126/25 B
2015/0201805 A1* 7/2015 Cedar .................... F23B 20/00
126/25 R

* cited by examiner

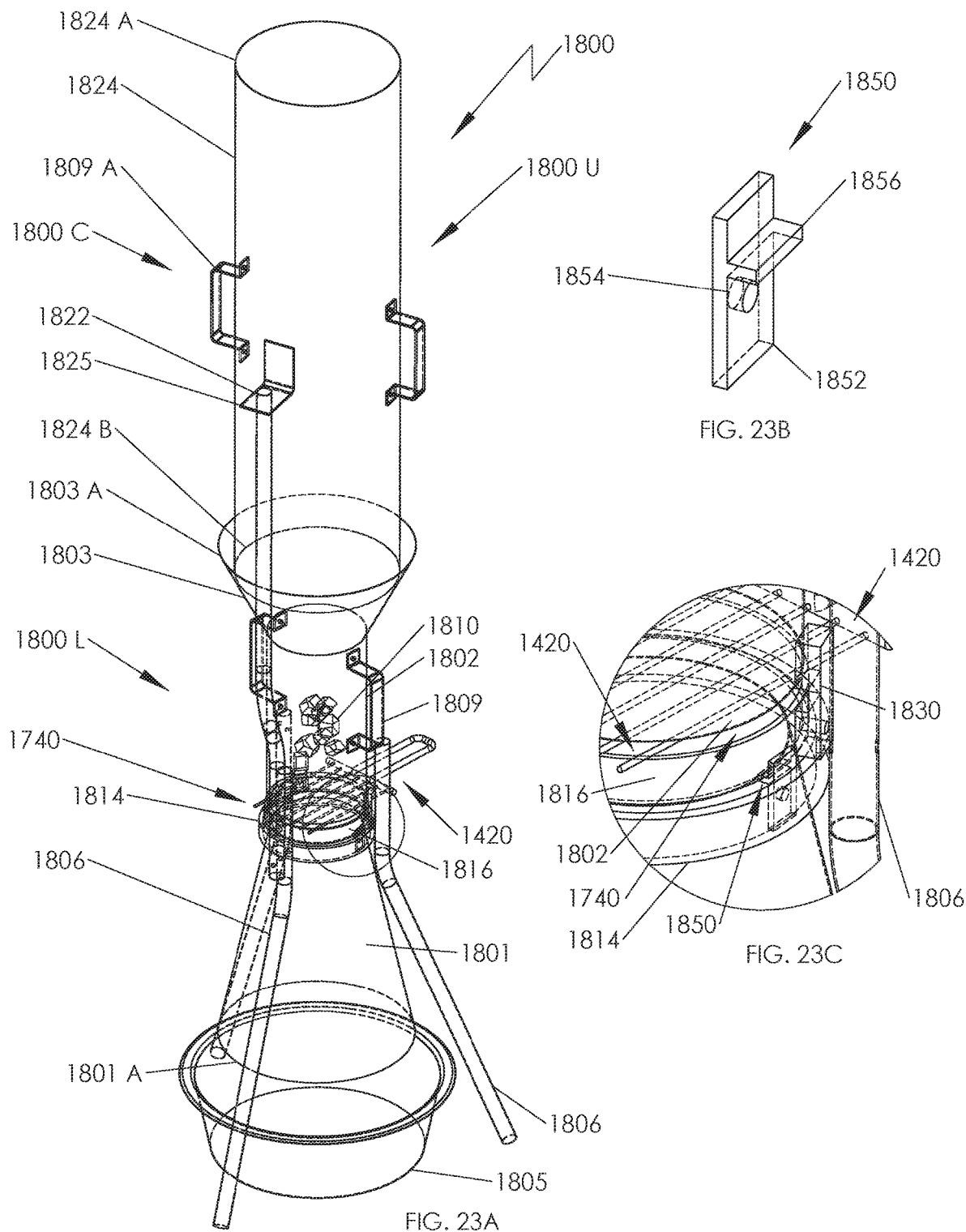

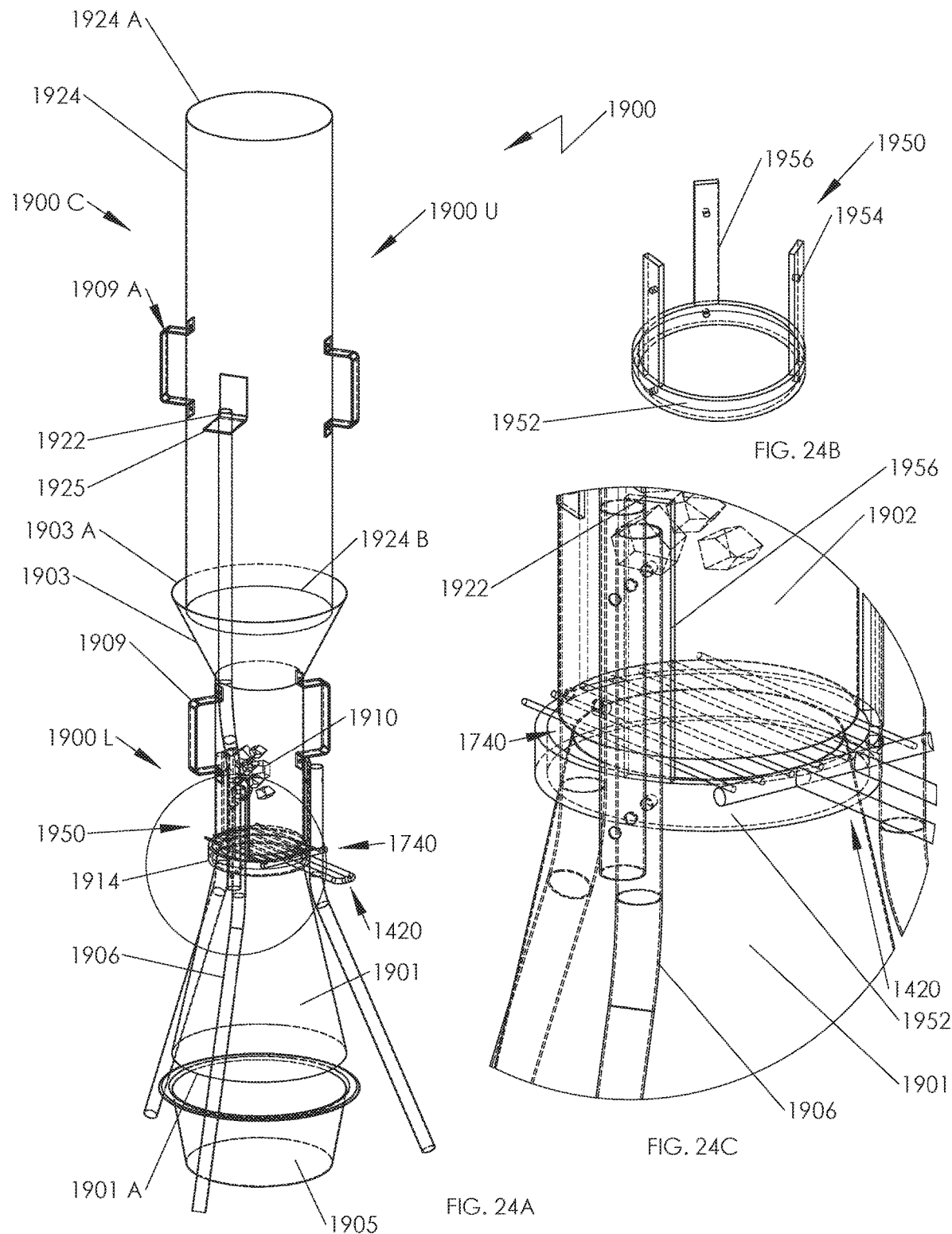

CHARCOAL IGNITER WITH BOTTOM RELEASE GRATE

CROSS-REFERENCE TO RELATED APPLICATION

The present application is a continuation-in-part application which claims benefit to U.S. patent application No. 15/365,494, entitled "Charcoal Igniter and Cooker Having a Venturi and Methods of Using Same", filed on Nov. 30, 2016 which claims benefit to Provisional Application No. 62/261,857, entitled "Charcoal Rocket", filed on Dec. 2, 2015. Also the present application is a continuation-in-part application which claims benefit to Provisional Application No. 62/459,059, entitled "Charcoal Igniter with Bottom Release Grate", filed on Feb. 15, 2017. The applications stated above are hereby incorporated by reference as if set forth in their entirety herein.

FIELD OF THE INVENTION

The present invention is generally related to a charcoal igniter, and more particularly to a charcoal igniter with a removable/releasable bottom grate system that moves out of the way of the charcoal or ignited wood chunks and allows the chunks to fall out the bottom of the charcoal igniter.

BACKGROUND OF THE INVENTION

Prior to the present invention, as set forth in general terms above and more specifically below, it is known, to employ various types of charcoal igniters. See for example, U.S. Pat. No. 4,417,565 by Karpinia, U.S. Pat. No. 4,909,237 by Karpinia, and U.S. Pat. No. 5,469,835 by Stephen et al. While these various charcoal igniters may have been generally satisfactory, there is nevertheless a need for a new and improved charcoal igniter that is constructed with a removable/releasable bottom grate so that the ignited charcoal may be released out of the bottom of the igniter unit thereby enabling a safer and more efficient process of igniting charcoal and delivering the burning charcoal to the cooking device such as a grill.

Current charcoal igniters have been on the market for some time. For example, a company named Weber has been selling various chimney-style charcoal starters for many years. Typically, these devices on the market are approximately 12" tall and 7" to 8" in diameter and often contain a fire grate at approximately 3" from the bottom of the cylindrical shape, as well as holes around a circumference near the bottom of the cylinder for airflow. However, these existing chimney-style charcoal starters typically have a fixed grate near the bottom of the cylindrical section. During operation of these chimney-style charcoal starters, charcoal is placed inside the cylinder such that the charcoal is located on top of the grate and then the charcoal is ignited. Once the ignited charcoal is ready for use, the user then has to hold the hot chimney-style charcoal starter and tip it over to dump out the hot coals into another device such as a charcoal grill where the actual cooking will take place.

It is a purpose of this invention to fulfill these and other needs in the charcoal igniter art in a manner more apparent to the skilled artisan once given the following disclosure.

BRIEF SUMMARY OF THE INVENTION

A first aspect of the present invention is a charcoal igniter having a circular or non-circular fire chamber such that the inside cavity of the fire chamber has an upper opening to the atmosphere, and a lower opening of the cross section to the atmosphere, and there is some means of suspending a releasable/removable grate within the cross section toward the bottom of the cavity. The cavity is filled with charcoal and the charcoal rests on the releasable grate. It is ignited and burns on top of the grate. The grate is then released to discharge the charcoal out of the bottom of the cavity.

Another aspect of the present invention described in the earlier application (in FIGS. 6 through 10) is upper airflow pipes. In the present invention, these upper airflow pipes are given further use herein as a means to creating more efficient combustion in the charcoal igniter and as a secondary use as a handle because airflow through the handle actually helps to cool the pipe, and these may be applied to every embodiment of the igniter in this present invention due to their functionality of working with a releasable grate system. In addition, the first aspect of the present invention may be applied to conventional charcoal chimney styles, as indicated in FIG. 13A, to make an incremental improvement in itself over the current art.

A second aspect of the present invention is a charcoal igniter and food cooker, including an upper section such that the upper section includes a first conical section having a distal end and a proximal end such that the proximal end of the first conical section includes a first conical section opening, a fire chamber having a distal end and a proximal end such that a releasable grate is located adjacent to the distal end of the fire chamber and the distal end of the first conical section is located adjacent to the proximal end of the fire chamber, wherein an amount of charcoal to be ignited is located within the fire chamber and adjacent to the releasable grate; and a stationary lower section such that the upper section is retained within the stationary lower section, wherein the stationary lower section includes a second conical section having a distal end and a proximal end such that the proximal end of the second conical section is located adjacent to the upper section and the distal end of the second conical section includes a second conical section opening, wherein the first and second conical openings have a diameter that is larger than a diameter of the fire chamber.

In one embodiment of the second aspect of the present invention, the charcoal igniter and food cooker include at least one opening located between the upper section and the stationary lower section, wherein a portion of the releasable grate is located within the opening.

In another embodiment of the second aspect of the present invention, the charcoal igniter and food cooker include a plurality of supports operatively attached to the upper section and the stationary lower section in order to form the opening.

In another embodiment of the second aspect of the present invention, the plurality of supports includes a plurality of support brackets, wherein each of the plurality of support brackets is operatively connected to each of the supports.

In another embodiment of the second aspect of the present invention, the plurality of support brackets includes a pivoting support pivotally connected to one of the plurality of support brackets, wherein the pivoting support includes at least one support extension having a first end and a second end, wherein the first end of the pivoting support is operatively connected to one of the plurality of support brackets.

In another embodiment of the second aspect of the present invention, the pivoting support includes a cooking implement having a plurality of support legs, wherein the second end of the pivoting support is operatively connected to one of the support legs.

A third aspect of the present invention is a charcoal igniter, including an upper section such that the upper section includes an elongated chimney stack having a first end, a first conical section having a distal end and a proximal end such that the proximal end of the first conical section includes a first conical section opening located adjacent to the first end of the elongated chimney stack, a fire chamber having a distal end and a proximal end such that a releasable grate is located adjacent to the distal end of the fire chamber and the distal end of the first conical section is located adjacent to the proximal end of the fire chamber, wherein an amount of charcoal to be ignited is located within the fire chamber and adjacent to the releasable grate; and a stationary lower section such that the upper section is retained within the stationary lower section, wherein the stationary lower section includes a second conical section having a distal end and a proximal end such that the proximal end of the second conical section is located adjacent to the upper section and the distal end of the second conical section includes a second conical section opening, wherein the first and second conical openings have a diameter that is larger than a diameter of the fire chamber.

In one embodiment of the third aspect of the present invention, the charcoal igniter includes at least one opening located between the upper section and the stationary lower section, wherein a portion of the releasable grate is located within the opening.

In another embodiment of the third aspect of the present invention, the stationary lower section includes an upper leg support, and a lower leg support, wherein the upper leg support and the lower leg support are operatively connected to a plurality of supporting legs.

In another embodiment of the third aspect of the present invention, the upper section includes a plurality of handles operatively attached to the chimney stack, a chimney stack connector operatively connected to the extended chimney stack, and a strut having a first end and a second end such that the first end of the strut is operatively connected to the chimney stack connector and the second end of the strut is operatively connected to one of the plurality of supporting legs.

In even further embodiment of the third aspect of the present invention, the charcoal igniter includes at least one support bracket operatively connected to the upper section and the lower section in order to form the opening.

In still another embodiment of the third aspect of the present invention, the at least one support bracket includes a bracket base, a bracket opening located on the bracket base, and a bracket ledge located at one end of the bracket base.

In yet another embodiment of the third aspect of the present invention, the at least one support bracket includes a bracket base, a plurality of bracket arms having a first end and a second end such that the first end of each of the bracket arms is operatively connected to the bracket base, and a bracket opening located adjacent to the second end of each of the plurality of bracket arms.

A fourth aspect of the present invention is a charcoal igniter having a refractory insert, including: an upper section such that the upper section includes an elongated chimney stack having a first end, a refractory insert such that the refractory insert includes a first conical section having a distal end and a proximal end such that the proximal end of the first conical section includes a first conical section opening facing the first end of the elongated chimney stack, a fire chamber having a distal end and a proximal end such that a releasable grate is located adjacent to the distal end of the fire chamber and the distal end of the first conical section is located adjacent to the proximal end of the fire chamber, wherein an amount of charcoal to be ignited is located within the fire chamber and adjacent to the releasable grate; and a stationary lower section such that the upper section is retained on the stationary lower section, wherein the stationary lower section includes a second section having a distal end and a proximal end such that the proximal end of the second section is located adjacent to the upper section and the distal end of the second section includes a second section opening, wherein the first conical opening and the second opening have a larger opening area that is larger than a diameter of the fire chamber.

In one embodiment of the fourth aspect of the present invention, the refractory insert includes a refractory insert upper conical opening, a refractory insert upper opening located adjacent to the refractory insert upper conical opening, a fire chamber having a first end and a second end, wherein the first end of the fire chamber is operatively connected to the refractory insert upper opening, a refractory insert lower opening, wherein the second end of the fire chamber is operatively connected to the refractory insert lower opening, a refractory insert lower conical opening located adjacent to the refractory insert lower opening, and a refractory insert sleeve, wherein the refractory sleeve encloses the refractory insert upper conical opening, the refractory insert upper opening, the fire chamber, the refractory insert lower opening, and the refractory insert lower conical opening.

In another embodiment of the fourth aspect of the present invention, the stationary lower section includes a grate actuator operatively connected to the releasable grate.

In still yet another embodiment of the fourth aspect of the present invention, the stationary lower section includes a damper located adjacent to the releasable grate, and a damper actuator operatively connected to the damper.

In still another embodiment of the fourth aspect of the present invention, the damper includes a plate damper.

In an even still another embodiment of the fourth aspect of the present invention, the stationary lower section includes an accelerator section, wherein the accelerator section has a first end and a second end such that the first end of the accelerator section includes the second opening.

In yet another embodiment of the fourth aspect of the present invention, the accelerator section includes a flared section such that an area of the first end of the accelerator section is wider in cross-section than the second end of the accelerator section.

The preferred charcoal igniter with a venturi effect having a removable/releasable bottom grate, according to various embodiments of the present invention, offers the following advantages: ease of use of the charcoal igniter; excellent charcoal ignition capabilities; the ability to use the charcoal igniter as a food cooker; the ability to provide air substantially throughout the entire amount of charcoal in the igniter; lightness in weight; excellent durability; portability; the ability to dump out the ignited charcoal without having to excessively handle the charcoal igniter; the ability to move the charcoal igniter out of the way of the grilling surface after the ignited charcoal has been dumped into the grilling area; and reduced cost. In fact, in many of the preferred embodiments, these advantages are optimized to an extent that is considerably higher than heretofore achieved in prior, known charcoal igniters.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 23A is a schematic illustration of still another embodiment of the charcoal igniter having a venturi showing the fourth embodiment with the removable/releasable bottom grate being inserted within the charcoal igniter, wherein this embodiment includes an extended chimney stack, constructed according to the present invention;

FIG. 23B is a schematic illustration of the fire chamber support bracket for use in conjunction with the charcoal igniter of FIG. 23A, constructed according to the present invention;

FIG. 23C is a detailed view of the fire chamber support brackets being attached to the charcoal igniter to form the opening, constructed according to the present invention;

FIG. 24A is a schematic illustration of yet another embodiment of the charcoal igniter having a venturi showing the fourth embodiment with the removable/releasable bottom grate being inserted within the charcoal igniter, wherein this embodiment includes an extended chimney stack, constructed according to the present invention;

FIG. 24B is a schematic illustration of the fire chamber support bracket for use in conjunction with the charcoal igniter of FIG. 24A, constructed according to the present invention;

FIG. 24C is a detailed view of the fire chamber support brackets being attached to the charcoal igniter to form the opening, constructed according to the present invention;

DETAILED DESCRIPTION OF THE PREFERRED EMBODIMENTS OF THE INVENTION

Figure 1:
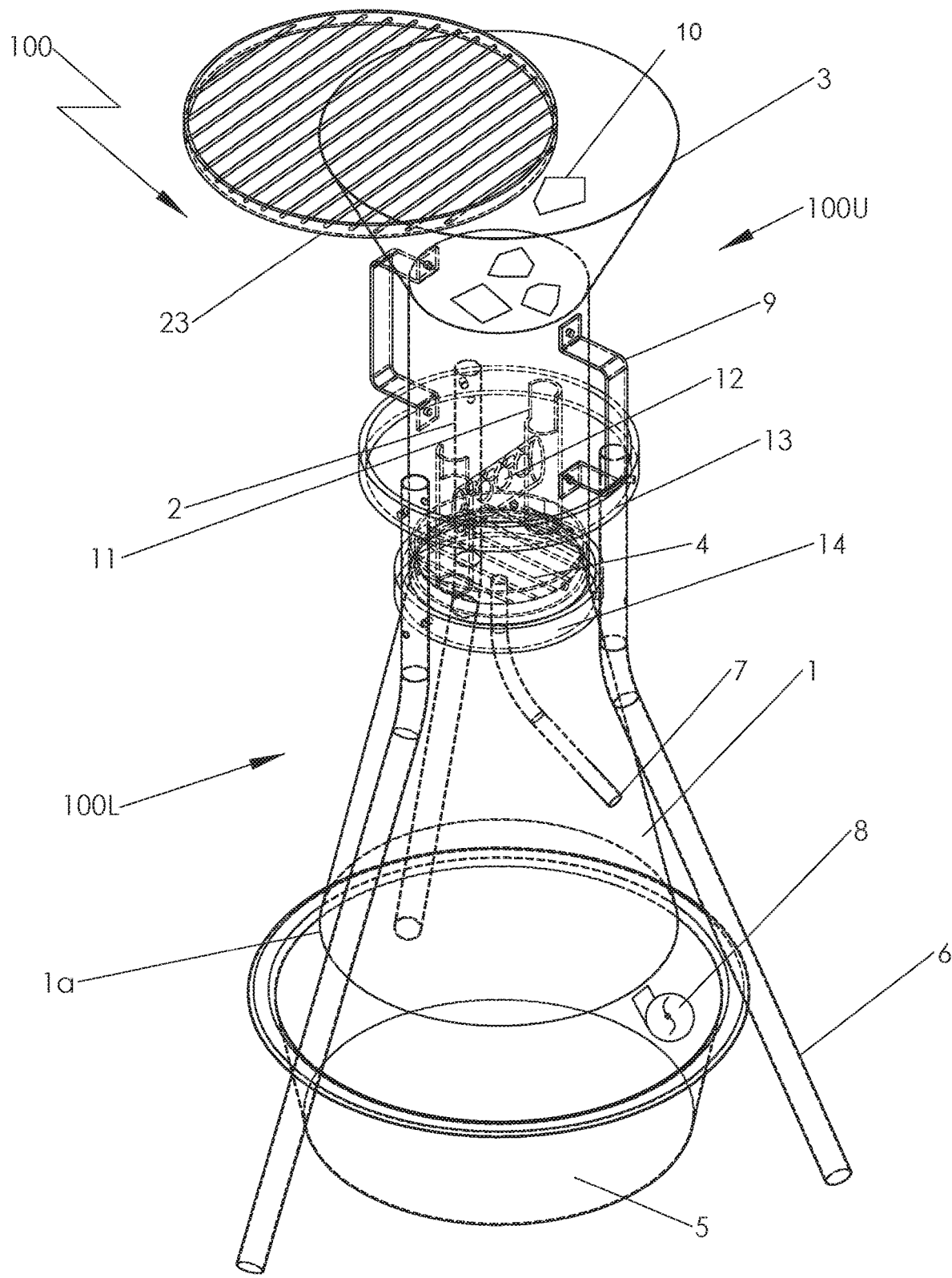
FIG. 1 is a schematic illustration of a charcoal igniter having a venturi, constructed according to the present invention.

Referring now to FIG. 1, there is illustrated a charcoal igniter 100 that is constructed with a venturi. As will be explained hereinafter in greater detail, the charcoal igniter 100 uses a venturi in order to more efficiently and quickly ignite the charcoal 10. Also, the charcoal igniter 100 can possibly be used as a food cooker, as will discussed in greater detail later.

Figure 2:
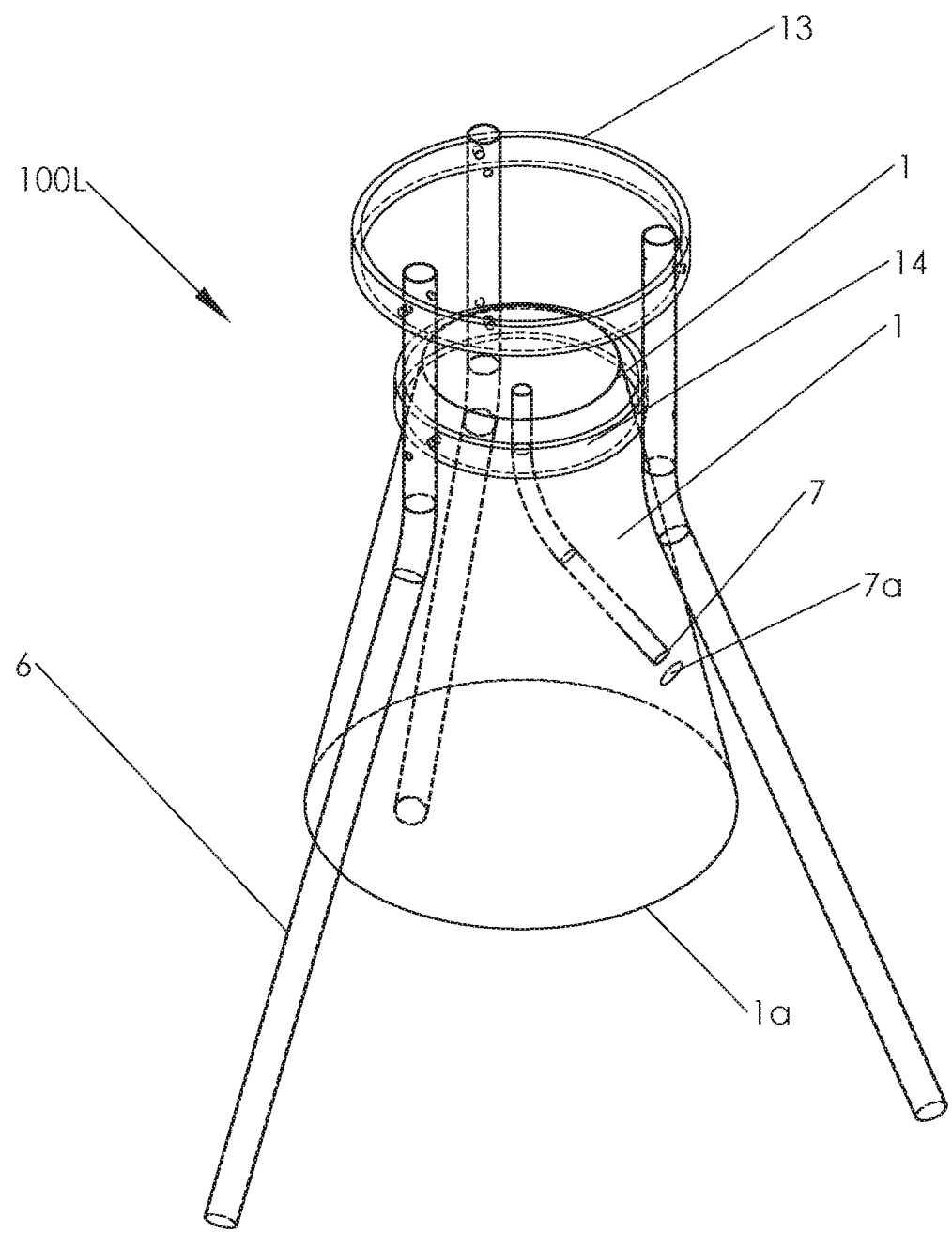
FIG. 2 is a schematic illustration of the lower section of the charcoal igniter, with the upper section removed, constructed according to the present invention.

Referring now more particularly to FIG. 1, charcoal igniter 100, includes, in part, upper section 100U and lower section 100L. With respect to lower section 100L, as shown in FIG. 2, lower section 100L includes, in part, accelerator section 1, opening 1a, ash collection pan 5 (FIG. 1), a plurality of support legs 6, igniter port 7, igniter port cap 7a, upper leg support 13, and lower leg support 14. It is to be understood that the various components of lower section 100L can be constructed of any suitable, durable material such as aluminum, steel or stainless steel. It is to be further understood that an optional blower 8 or other suitable device can be used to provide increased air flow through the opening 1a of accelerator section 1.

With respect to accelerator section 1, accelerator section 1 is conventionally attached to lower leg support 14 by conventional fasteners. Also, support legs 6 are also conventionally attached to lower leg support 14 and upper leg support 13 by conventional fasteners. As shown in FIG. 1, accelerator section 1 includes an opening 1a. It is to be understood that this opening 1a must be bigger in diameter (or cross-section) than the diameter (or cross-section) of the fire chamber 2 in order to provide the proper venturi effect in charcoal igniter 100. It is to be further understood that the dimensions and distance between upper leg support 13 and lower leg support 14 should be such that upper section 100U is able to be removably retained within lower section 100L and still allow the charcoal 10 located within fire chamber 2 to be properly ignited.

Regarding ash collection pan 5, preferably, ash collection pan 5 is any suitable collection pan that is capable of collecting any ashes and/or hot pieces of ignited charcoal that may fall down from fire chamber 2.

With respect to the plurality of support legs 6, support legs 6 allow charcoal igniter 100 to be longer and thus create better air flow through charcoal igniter 100. Also, support legs 6 allow the use of ash collection pan 5 to be located below lower section 100L. It is to be understood that the number of support legs 6 can vary with the important consideration being that the support legs 6 must provide adequate stability for charcoal igniter 100.

With respect to igniter port 7, as will be discussed in greater detail later, igniter port 7 is attached to accelerator section 1 by conventional techniques such as welding or using conventional fasteners. In this manner, igniter port 7 allows the user to insert a flame from a conventional lighting implement such as a torch or other similar device in order to provide a flame to the charcoal 10 located at the other end of the igniter port 7 which is located within the upper end of the accelerator section 1 and adjacent to lower grate 4, as shown in FIG. 2. FIG. 2 shows the bent pipe suspended directly under the lower grate and the charcoal to be ignited in the bottom of the fire chamber area. It is to be understood that igniter port 7 could also be attached to fire chamber 2 and enter through the sidewall of the fire chamber area (not shown in this configuration). The igniter port cap 7a is used to prevent any contaminants or other unwanted debris from entering into igniter port 7 when the charcoal igniter 100 is not in use by simply placing igniter port cap 7a over the open end of igniter port 7 located adjacent to accelerator section 1. Also, igniter port cap 7a is used to prevent any sparks or lit pieces of charcoal 10 from falling out of igniter port 7 after the charcoal igniter 100 has been lit. It is to be further understood that the length of igniter port 7 should be such that the flame from the conventional lighting implement is able to reach the charcoal 10 located within fire chamber 2 but at the same time keep the user from getting too close to the charcoal 10 that is being ignited. Igniter port 7 is of such a diameter to also allow airflow by convection just after ignition. It is to be understood that compressed air or air under fan pressure can be forced into the igniter port for additional speed in igniting the charcoal.

Figure 3:
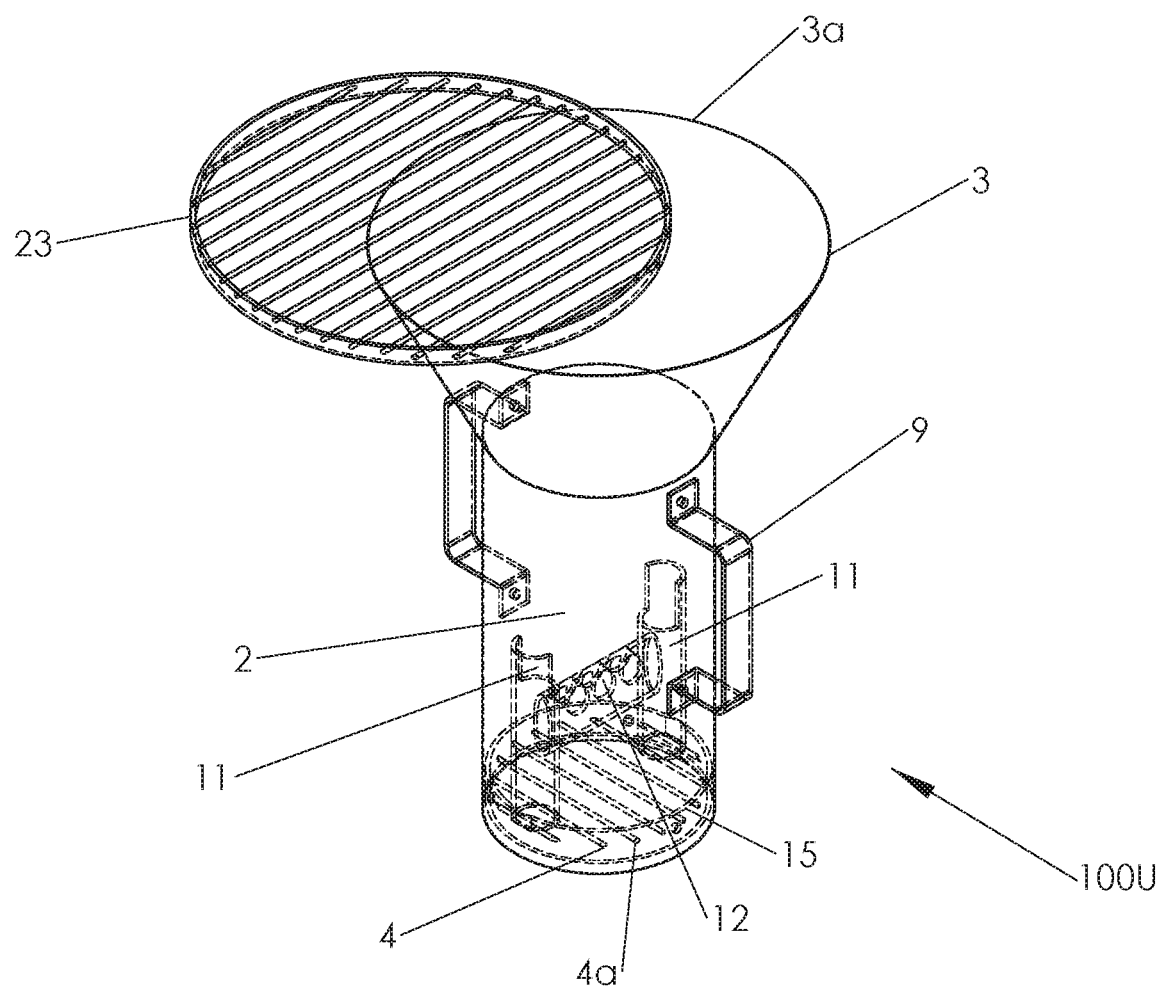
FIG. 3 is a schematic illustration of the upper section of the charcoal igniter, constructed according to the present invention.

With respect to upper section 100U, as shown in FIG. 3, upper section 100U includes, in part, fire chamber area 2, conical top section 3, opening 3a, lower grate 4, a plurality of handles 9, at least one air flow riser 11, air infusion pipe 12, grate support and attachment ring 15 and optional cooking grate 23. It is to be understood that the various components of upper section 100U can be constructed of any suitable, durable material such as aluminum, steel or stainless steel. It is to be further understood that fire chamber 2 should be constructed of any suitable, durable, high heat resistant material that will not melt or burn such as steel, stainless steel or ceramic.

With respect to fire chamber area 2, as will be discussed in greater detail later, fire chamber 2 is used to hold the charcoal 10 (FIG. 1) so that the charcoal 10 can be ignited. It is to be understood that the dimensions of fire chamber area 2 should be such that a sufficient amount of charcoal 10 can be retained within fire chamber 2 in order to provide a suitable amount of ignited charcoal to the user.

With respect to conical top section 3, top section 3 is preferably shaped in the form of a cone in order to assist in providing the venturi effect to charcoal igniter 100, as will be discussed in greater detail later. It is to be understood that the dimensions of conical top section 3 should be such that a sufficient venturi effect can be achieved in charcoal igniter 100. As discussed above, it is to be understood that the opening 3a in conical top section 3 must be larger in diameter (or cross-section) than the diameter (or cross-section) of fire chamber 2 in order to provide the proper venturi effect in charcoal igniter 100. It is to be further understood that accelerator section 1, conical top section 3 and fire chamber 2 are shown as being circular but other geometric shapes for the cross-section can be used.

With respect to lower grate 4, lower grate 4 is used in conjunction with fire chamber 2 in order to retain the charcoal 10 (FIG. 1) within fire chamber 2. Lower grate 4, includes, in part, a plurality of bars 4a that are spaced apart from each other in order to allow air to flow through the lower grate 4 and into fire chamber 2. It is to be understood that the dimensions and the configurations of the plurality of bars 4a with respect to each other can be varied as long as air is able to properly flow through lower grate 4 and into fire chamber 2.

With respect to handles 9, preferably, handles 9 are conventionally attached to the sides of fire chamber 2 by conventional fasteners. It is to be understood that the size and shape of handles 9 should be such that the user is able to easily dump the ignited charcoal from the upper section 100U without the user's hands becoming too hot due to being exposed to the ignited charcoal in the fire chamber 2.

Figure 4:
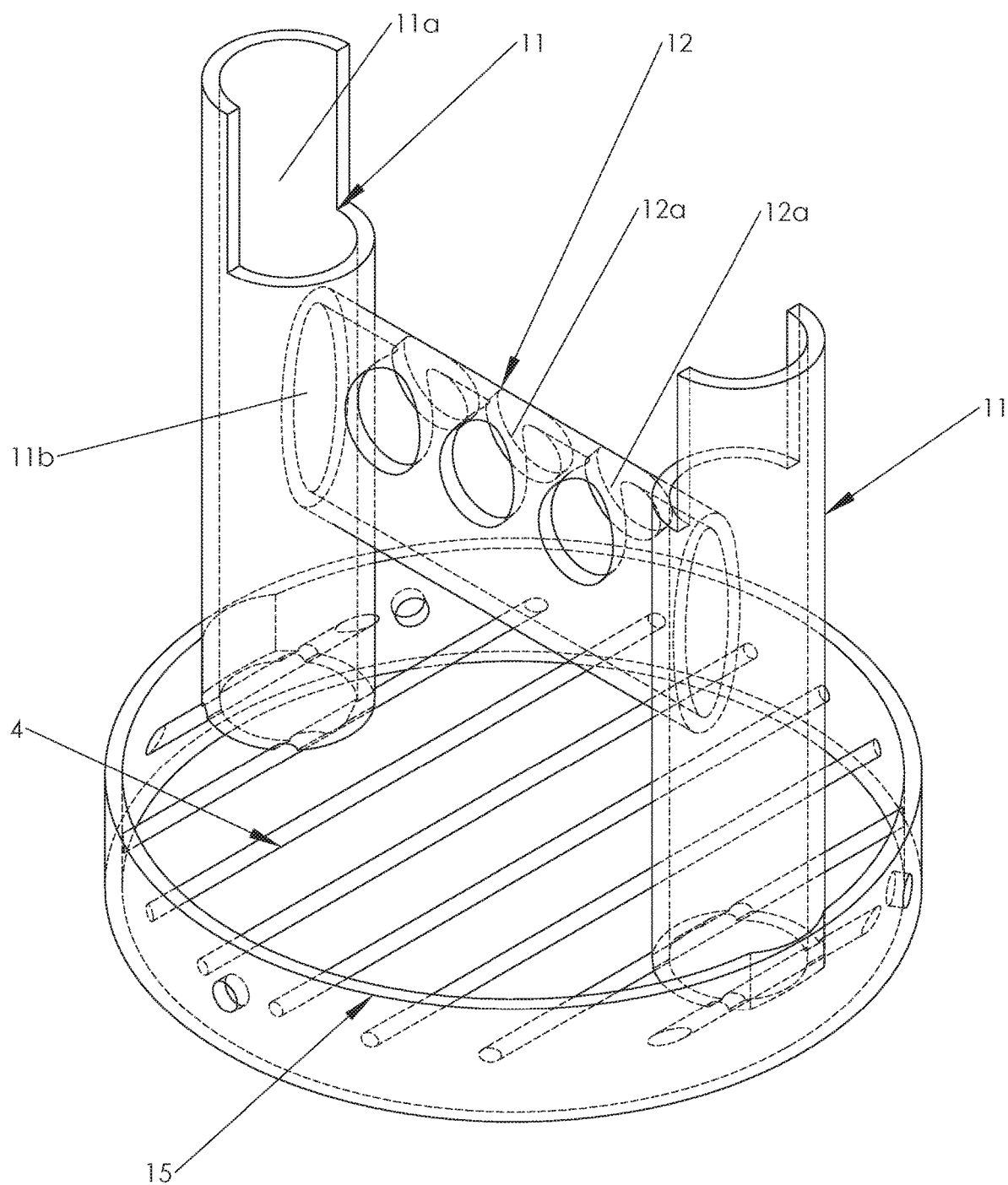
FIG. 4 is a cut-away view of the upper section of the charcoal igniter, showing the internal air flow risers and the fire infusion pipe, constructed according to the present invention.

With reference now to FIGS. 3 and 4, the plurality of air flow risers 11 and air infusion pipe 12 will now be discussed. Preferably, air flow risers 11 are conventionally attached to lower orate 4 and grate support and attachment ring 15 by conventional techniques such as welding. As will be discussed in greater detail later, air flow risers 11 allow air to flow past lower grate 4, out of openings 11a and into an upper portion of the charcoal 10 that is located within fire chamber 2. It is to be understood that the dimensions of air flow risers 11 should be such that an adequate amount of air will be able to be introduced into the upper portion of the charcoal 10 located within fire chamber 2.

Regarding air infusion pipe 12, air infusion pipe 12 is conventionally attached to openings 11b in the plurality of air flow risers 11 by conventional techniques such as welding. As will be discussed in greater detail later, air infusion pipe 12 includes a plurality of holes 12a that interact with the openings 11b in air flow risers 11 to allow air to flow past lower grate 4 and into an upper portion of the charcoal 10 that is located within fire chamber 2. In this manner, air is able to be introduced into several different portions of the charcoal 10 to be ignited instead of merely igniting the charcoal 10 from the bottom of the charcoal 10, as has been the practice of the prior art. Also, the use of the air flow risers 11 and the air infusion pipe 12 allow more air to be added into the charcoal bed zone above the bottom burning bed zone of the charcoal 10. This is because as the bottom bed of charcoal 10 on the lower grate 4 burns first, the burning continues upwards to the upper layer of the charcoal 10. A unique aspect of the present invention is that the air flow risers 11 and the air infusion pipe 12 add airflow (more unused oxygen) directly to the hot gases rising off the lower bed of the charcoal 10, thereby adding a fresh charge of oxygen to the hot gases and fuel in the upper layers of charcoal 10 to help charcoal 10 ignite faster. It is to be understood that the dimensions of the air infusion pipe 12 and the number of openings 12a in air infusion pipe 12 should be such that an adequate amount of air will be able to be introduced into the upper portion of the charcoal 10 located within fire chamber 2.

With reference now to FIGS. 1-4, the operation and use of charcoal igniter 100 will now be discussed. Initially, the user determines the amount of charcoal 10 to be placed within fire chamber 2 through conical top section 3. Conical top section 3 acts as a funnel in order to assist the user in introducing the charcoal 10 into fire chamber 2. It is to be understood that while charcoal 10 is the preferred material to be used within charcoal igniter 100, dried chunks of wood or other suitable types of materials can be used as long as they provide adequate heating/cooking properties similar to charcoal. Once the amount of charcoal has been determined, the user can place upper section 100U on top of lower section 100U in order to add the charcoal to fire chamber 2. It is to be further understood that the user may simply add the charcoal to fire chamber 2 and then place upper section 100U onto lower section 100L.

After the upper section 100U has been placed on lower section 100L, the user simply removes ignition port cap 7a (FIG. 1) and applies a conventional ignition device such as a torch to the open end of ignition port 7 located adjacent to accelerator section 1. In this manner, the flame should travel up ignition port 7 and interact with the bottom of the portion of the charcoal 10 located in fire chamber 2 adjacent to the other end of ignition port 7 in order to ignite the lower portion of the charcoal 10.

Once the lower portion of the charcoal 10 has been sufficiently ignited, one of the unique aspects of the present invention comes into play. As the bottom of the charcoal 10 becomes ignited, the ignited charcoal 10 starts to draw air up through lower grate 4, air flow risers 11 and air infusion pipe 12. The drawing of the air into air flow risers 11 and air infusion pipe 12 allows air to be efficiently introduced into the middle and upper portions of the charcoal 10 located in fire chamber 2. It is to be understood that this concept is unique since this allows the entire amount of charcoal 10 to become completely ignited without having to wait for the bottom portion of the charcoal 10 to become ignited and then allowing the heat from the lower portion of the charcoal 10 to ignite subsequent upper portions of the charcoal 10. Since substantially the entire amount of the charcoal 10 is being ignited at the same time, the heat required to ignite the subsequent upper portions of the charcoal 10 is not being wasted.

In another unique aspect of the present invention, the different diameters of the accelerator section opening 1a and the conical top section opening 3a in conjunction with the fire chamber 2 create a venturi effect for the charcoal igniter 100. Also, due to the fact that accelerator opening 1a is larger in diameter than a diameter of fire chamber 2, air velocity at lower grating 4 is increased. Further, due to the fact that charcoal 10 further restricts the open passages in fire chamber 2, the air flow increases as the air goes through the charcoal 10 in the fire chamber 2 on its way up and out of conical tip section opening 3a. In this manner, the convective hot gases flowing upward create more airflow up through accelerator opening 1a. It is to be understood that due to the fact that the volume within accelerator section 1 is greater than the volume of fire chamber 2, a net increase in the velocity of the air that passes through fire chamber 2, lower grate 4, air flow risers 11, and air infusion pipe 12 is created when air begins to flow through charcoal igniter 100 once the charcoal 10 is ignited. As heat is created in fire chamber 2, an updraft is created within fire chamber 2, air flow risers 11, and air infusion pipe 12. The dimensions of fire chamber 2 create a restriction in the air flow which cause the air flow to accelerate even more through fire chamber 2, air flow risers 11 and air infusion pipe 12 which allows the air to be distributed over substantially the entire amount of charcoal 10 located within fire chamber 2 thereby encouraging a quicker and more efficient, complete ignition of the charcoal 10.

In a still another unique aspect of the present invention, as shown in FIG. 3, charcoal igniter 100 can be equipped with an optional upper cooking grate 23 that is placed over conical top section opening 3a after the upper section 100U is placed on top of the lower section 100L Once the charcoal 10 has been ignited, the user can simply place the upper cooking grate 23 over conical top section opening 3a. In this manner, the user can then place a cooking implement such as a cooking pot or cooking pan (not shown) and use the heat being emitted from the ignited charcoal 10 in order to heat any food placed within the cooking implement. It is to be understood that the user can also place the food to be cooked on skewers or other similar types of cooking implements and simply cook the food directly over the upper cooking grate 23. In this manner, the upper cooking grate 23 will act as a retainer for assisting in the cooking of the food and a barrier to prevent unwanted sparks or other lit particles from the ignited charcoal from leaving the fire chamber 2 and inadvertently contacting the user or the food being cooked by the user.

Figure 5:
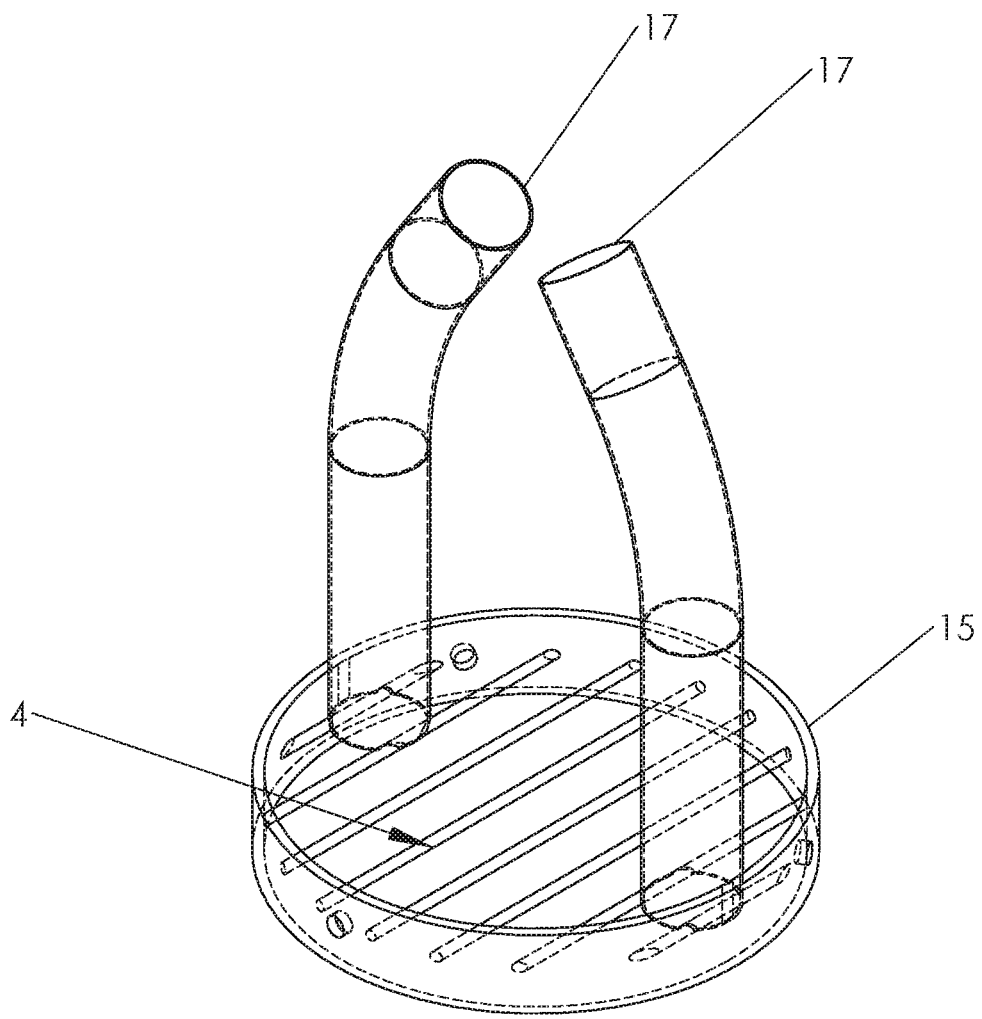
FIG. 5 is a cut-away view of the upper section of the charcoal igniter, showing another embodiment of the internal air flow risers, wherein the internal air flow risers are bending inwardly to infuse airflow into the mid-section of the fire chamber, constructed according to the present invention.

With respect to FIG. 5, there is illustrated another embodiment of the plurality of air flow risers 17. Preferably, air flow risers 17 are conventionally attached to lower grate 4 and grate support and attachment ring 15 by conventional techniques such as welding in a similar manner that air flow risers 11 are attached to lower grate 4 and grate support and attachment ring 15. As can be seen in FIG. 5, in this embodiment, air flow risers 17 are extended so that the air that flows up and through air flow risers 17 will interact with an upper and/or mid-portion of the charcoal 10 located within fire chamber 2. It is to be understood that the air flow risers 17 are constructed so as to angle towards one another at a location towards the upper and/or mid-portion of the charcoal 10 located within fire chamber 2. In this manner, the angling of the air flow risers 17 allows air to be efficiently introduced into the upper and/or mid-portion of the charcoal 10 located within fire chamber 2. It is to be further understood that the dimensions of air flow risers 17 should be such that an adequate amount of air will be able to be introduced into the upper and/or mid-portion portion of the charcoal 10 located within fire chamber 2.

Figure 6:
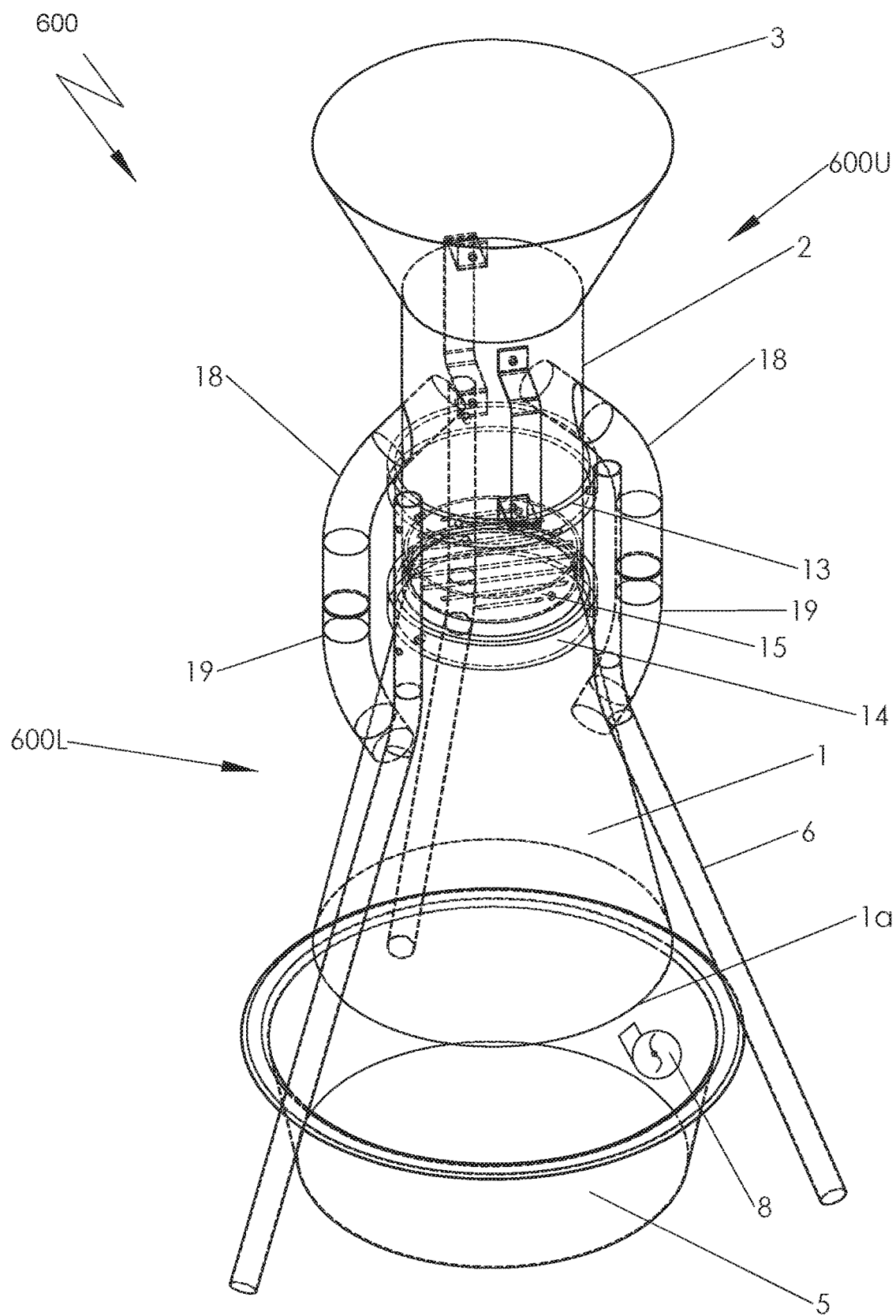
FIG. 6 is a schematic illustration of a second embodiment of the charcoal igniter having a venturi, wherein this embodiment includes external air flow pipes, constructed according to the present invention.

Regarding FIG. 6, there is illustrated another embodiment of the charcoal igniter 600. The components of FIGS. 7 and 8 combine to achieve the embodiment shown in FIG. 6 Charcoal igniter 600, includes, in part, upper section 600U and lower section 600L. With respect to lower section 600L, as shown in FIG. 6, lower section 600L includes, in part, accelerator section 1, opening 1a, ash collection pan 5, a plurality of support legs 6, upper leg support 13, lower leg support 14, and lower external air flow pipes 19. It is to be understood that the various components of lower section 600L can be constructed of any suitable, durable material such as aluminum, steel or stainless steel. It is to be further understood that the fire chamber 2, as shown in FIG. 6, is constructed of the same materials as the fire chamber 2 illustrated in FIG. 1. It is to be even further understood that except for the use of the upper external airflow pipes 18 and lower external air flow pipes 19, as discussed below, charcoal igniter 600 is constructed in substantially the same manner as charcoal igniter 100 and operates in substantially the same manner as charcoal igniter 100 including igniter port 7 and igniter port cap 7a.

Figure 7:
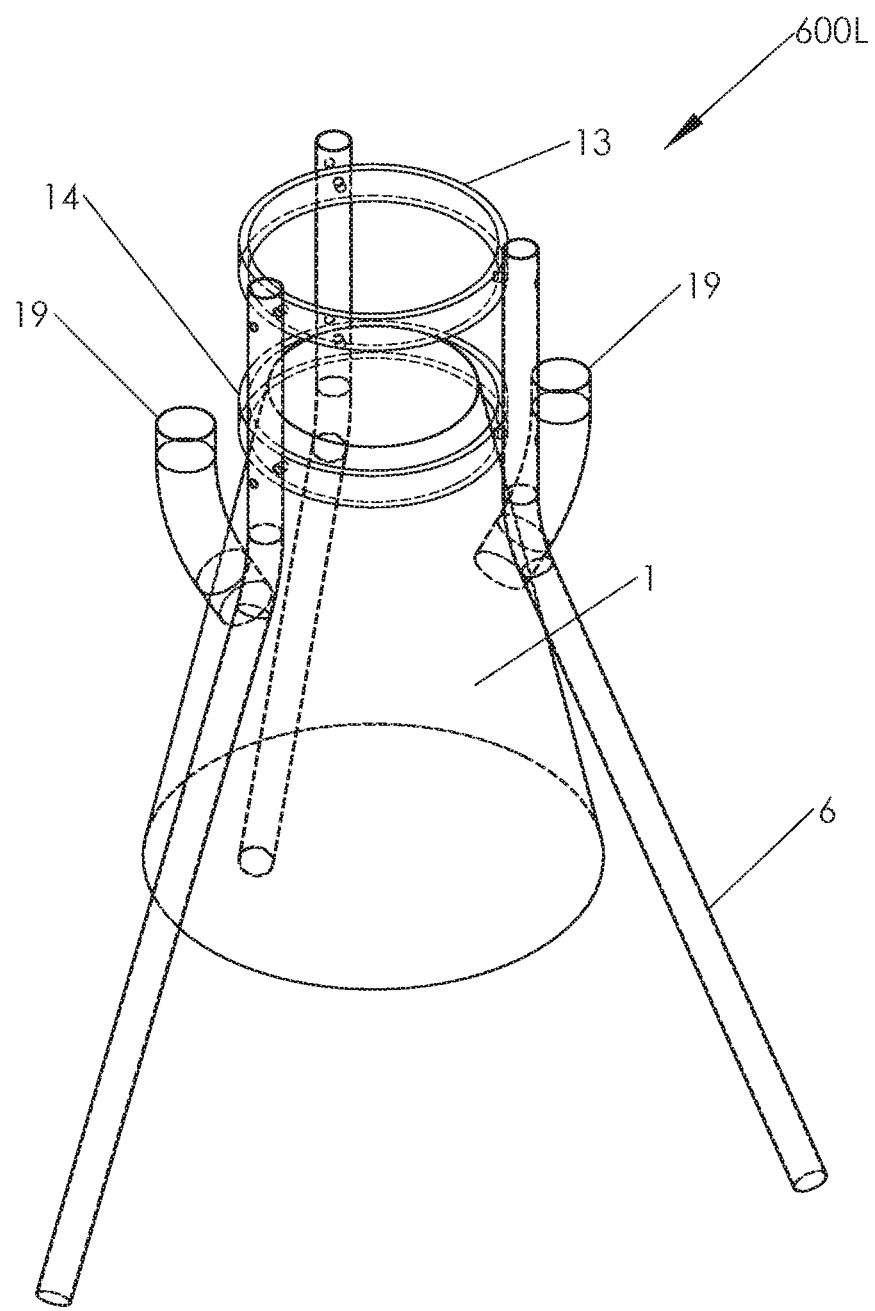
FIG. 7 is a schematic illustration of the lower section of the another embodiment of the charcoal igniter having a venturi, as shown in FIG. 6, wherein the external airflow pipes are attached to the accelerator section, constructed according to the present invention.

As can be seen in FIG. 7, lower external air flow pipes 19 are conventionally attached to openings in an upper section of accelerator section 1 by conventional techniques such as welding or through the use of conventional fasteners. It is to be understood that lower section 600L is constructed in substantially the same manner as lower section 100L of charcoal igniter 100 except for the addition of the lower external air flow pipes 19.

Figure 8:
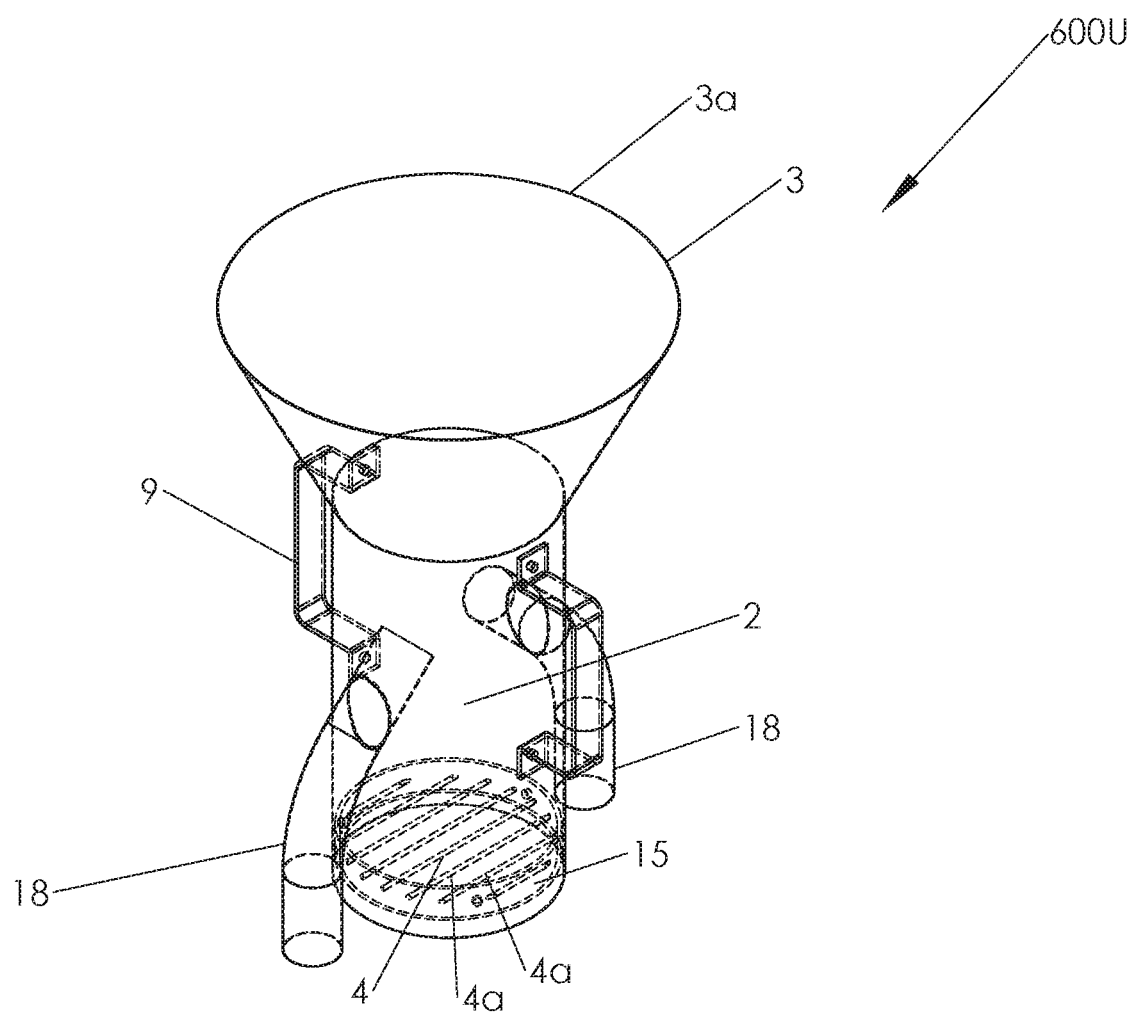
FIG. 8 is a schematic illustration of the upper section of the another embodiment of the charcoal igniter having a venturi, as shown in FIG. 6, constructed according to the present invention.

With respect to upper section 600U, upper section 600U includes upper external air flow pipes 18, as shown in FIGS. 6 and 8. Upper external air flow pipes 18 are conventionally attached to openings in a mid-portion of the fire chamber 2 by conventional techniques such as welding or through the use of conventional fasteners. It is to be further understood that the diameters of upper external air flow pipes 18 and lower external air flow pipes 19 should be substantially the same in order to provide proper air flow through upper external air flow pipes 18 and lower external air flow pipes 19. It is to be even further understood that in order to allow upper section 600U to be removed from lower section 600L, upper external air flow pipes 18 and lower external air flow pipes 19 should not be permanently connected together. Instead, the user merely aligns upper external air flow pipes 18 and lower external air flow pipes 19 in order to provide proper air flow through upper external air flow pipes 18 and lower external air flow pipes 19.

Figure 9:
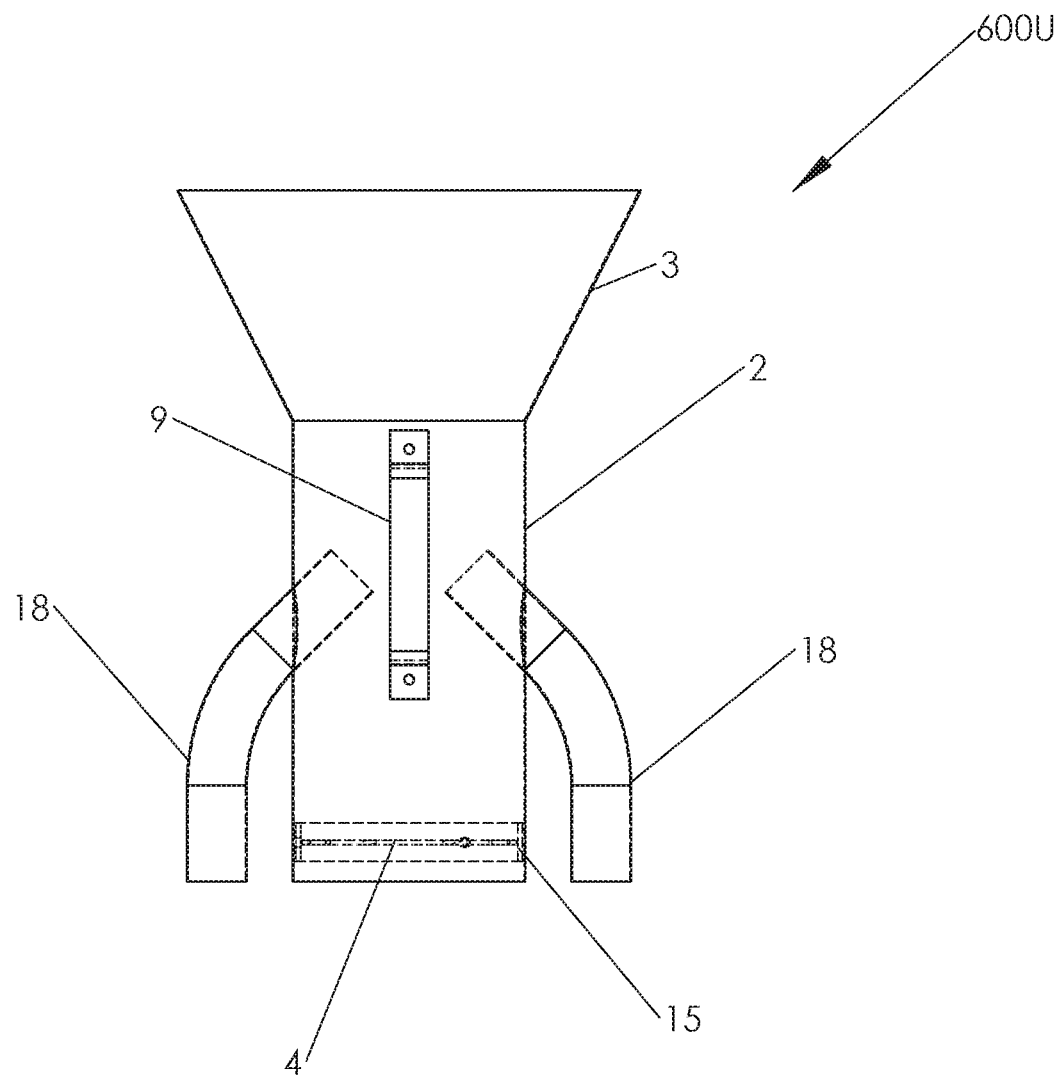
FIG. 9 is a side view of the upper section of the another embodiment of the charcoal igniter having a venturi, as shown in FIG. 8, constructed according to the present invention.

Regarding FIG. 9, there is illustrated a side view of the upper section 600U of charcoal igniter 600. As shown in FIG. 9, the upper external air flow pipes 18 extend into a mid-portion to upper portion of the fire chamber 2. In this manner, air is conducted through the lower external air flow pipes 19 (FIG. 6) and up through upper external air flow pipes 18 so that the air interacts with a mid-portion and/or an upper portion of the charcoal 10 in the fire chamber 2. It is to be further understood that the other unique aspects of the charcoal igniter 100 such as the venturi effect and the ability to use the charcoal igniter 100 as a food cooker/heater can equally be applied to charcoal igniter 600.

Figure 10:
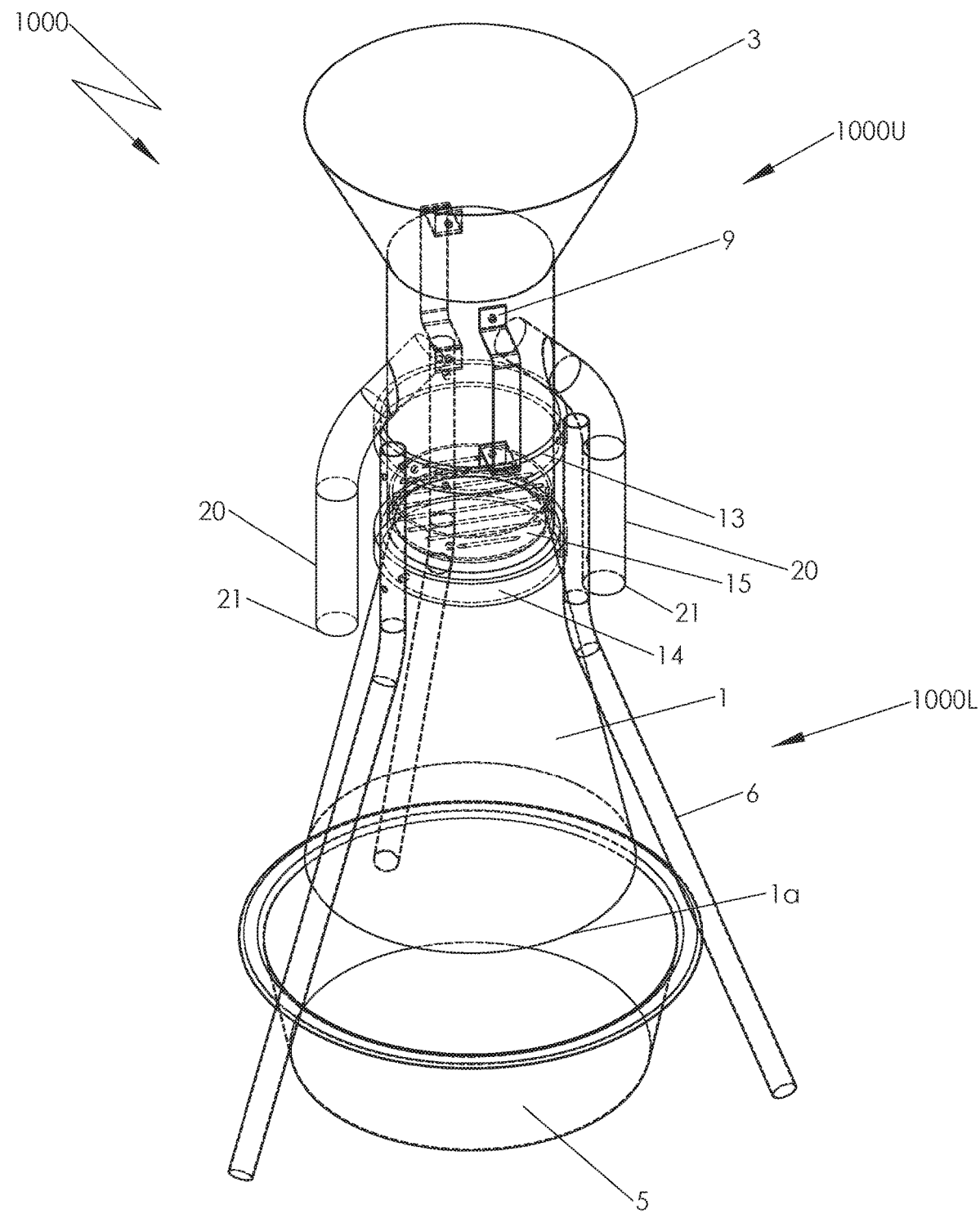
FIG. 10 is a schematic illustration of a third embodiment of the charcoal igniter having a venturi, wherein this embodiment includes another embodiment of the external air flow pipes with the distal ends of the external air flow pipes terminating in the atmosphere, constructed according to the present invention.

Regarding FIG. 10, there is illustrated another embodiment of the charcoal igniter 1000. Charcoal igniter 1000, includes, in part, upper section 1000U and lower section 1000L. With respect to lower section 1000L, as shown in FIG. 10, lower section 1000L includes, in part, accelerator section 1, opening 1a, ash collection pan 5, a plurality of support legs 6, upper leg support 13, and lower leg support 14. It is to be understood that the various components of lower section 1000L can be constructed of any suitable, durable material such as aluminum, steel or stainless steel. It is to be further understood that the fire chamber 2, as shown in FIG. 10, is constructed of the same materials as the fire chamber 2 illustrated in FIG. 1. It is to be even further understood that except for the use of the upper external airflow pipes 20 and closable plate 21, as discussed below, charcoal igniter 1000 is constructed in substantially the same manner as charcoal igniter 100 and operates in substantially the same manner as charcoal igniter 100 including igniter port 7 and igniter port cap 7a.

With respect to upper section 1000U, upper section 1000U includes upper external air flow pipes 20 and a closable plate 21. Upper external air flow pipes 20 are conventionally attached to openings in a mid-portion of the fire chamber 2 by conventional techniques such as welding or through the use of conventional fasteners. As can be seen in FIG. 10, upper external air flow pipes 20 terminate outside of the fire chamber 2. It is to be further understood that the diameters of upper external air flow pipes 20 should provide proper air flow through upper external air flow pipes 20.

It is to be further understood that closable plate 21 can be any suitable device that can be used to cover or dose the end of upper external air flow pipes 20 in order to control (dampen) the amount of air that is introduced into the charcoal 10 located with fire chamber 2 through upper external air flow pipes 20. For example, when it is desired to use charcoal igniter 1000 as a food cooker/heater, as previously discussed with respect to charcoal igniters 100 and 600, air flow in the upper external air flow pipes 20 is conventionally regulated (dampened) through the use of closable plate 21. In addition, the air flow in accelerator section 1 may be conventionally regulated (dampened) through the use of a closable plate (not shown).

Regarding FIG. 10, the upper external air flow pipes 20 extend into a mid-portion to an upper portion of the fire chamber 2. In this manner, air is conducted through the upper external air flow pipes 20 so that the air interacts with a mid-portion and/or an upper portion of the charcoal 10 in the fire chamber 2. In addition, due to the fact that external airflow pipes 20 terminate in the atmosphere and extend downwardly, external airflow pipes 20 create their own updraft and draw in coder, more dense air while not disrupting airflow in the accelerator section 1. It is to be further understood that the other unique aspects of the charcoal igniters 100 and 600 such as the venturi effect and the ability to use the charcoal igniters 100 and 600 as a food cooker/ heater can equally be applied to charcoal igniter 1000.

In particular, due to the fact that the volume within accelerator section 1 is greater than the volume of fire chamber 2, a net increase in the velocity of the air that passes through lower grate 4, fire chamber 2 and upper external air flow pipes 20 is created when air begins to flow through charcoal igniter 1000 once the charcoal 10 is ignited. Also, due to the fact that accelerator opening 1a is larger in diameter (or cross-section) than a diameter (or cross-section) of fire chamber 2, air velocity at lower grating 4 is increased. Further, due to the fact that charcoal 10 further restricts the open passages in fire chamber 2, the air flow increases as the air goes through the charcoal 10 in the fire chamber 2 on its way up and out of conical tip section opening 3a. In this manner, the convective hot gases flowing upward create more airflow up through accelerator opening 1a. As heat is created in fire chamber 2, an updraft is created within fire chamber 2 and upper external air flow pipes 20. The dimensions and location of fire chamber 2 create a restriction in the air flow which cause the air flow to accelerate even more through fire chamber 2 and upper external air flow pipes 20 which allows the air to be distributed over substantially the entire amount of charcoal 10 located within fire chamber 2 thereby encouraging a quicker and more efficient complete ignition of the charcoal 10.

Figure 11:
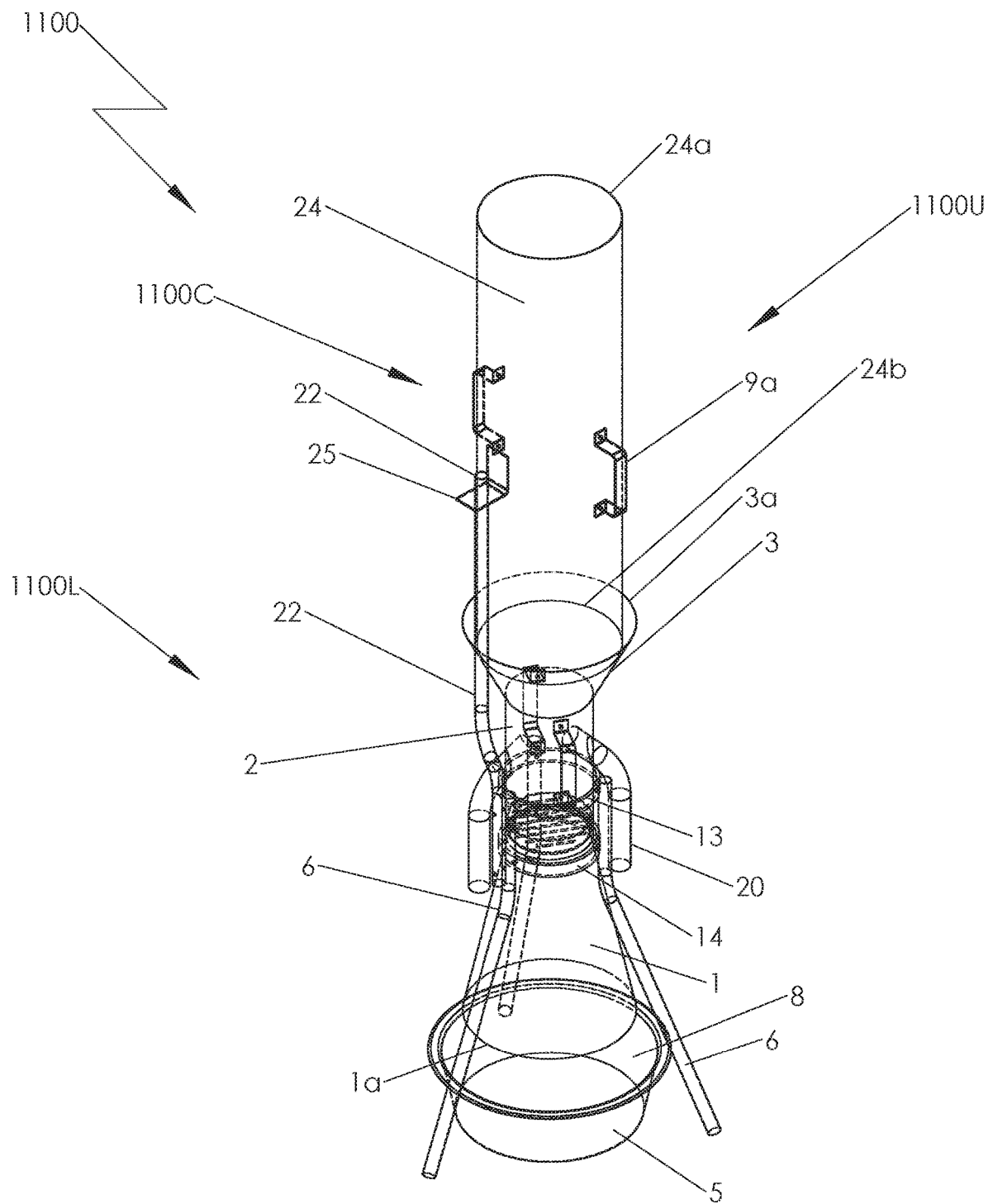
FIG. 11 is a schematic illustration of an even still another embodiment of the charcoal igniter having a venturi, wherein this embodiment includes an extended chimney stack, constructed according to the present invention.

Regarding FIG. 11, there is illustrated another embodiment of the charcoal igniter 1100. Charcoal igniter 1100, includes, in part, upper section 1100U and lower section 1100L. With respect to lower section 1100L, as shown in FIG. 11, lower section 1100L includes, in part, accelerator section 1, opening 1a, ash collection pan 5, a plurality of support leas 6, upper leg support 13, and lower leg support 14. It is to be understood that the various components of lower section 1100L can be constructed of any suitable, durable material such as aluminum, steel or stainless steel. It is to be further understood that the fire chamber 2, as shown in FIG. 11, is constructed of the same materials as the fire chamber 2 illustrated in FIG. 1. It is to be even further understood that except for the use of the extended chimney stack 1100C, as discussed below, charcoal igniter 1100 is constructed in substantially the same manner as charcoal igniter 1000 and operates in substantially the same manner as charcoal igniter 1000 including igniter port 7 and igniter port cap 7a.

With respect to upper section 1100U, upper section 1100U includes upper external air flow pipes 20. Upper external air flow pipes 20 are conventionally attached to openings in a mid-portion of the fire chamber 2 by conventional techniques such as welding or through the use of conventional fasteners. As can be seen in FIG. 11, upper external air flow pipes 20 terminate outside of the fire chamber 2. It is to be further understood that the diameters of upper external air flow pipes 20 should provide proper air flow through upper external air flow pipes 20.

Figure 12:
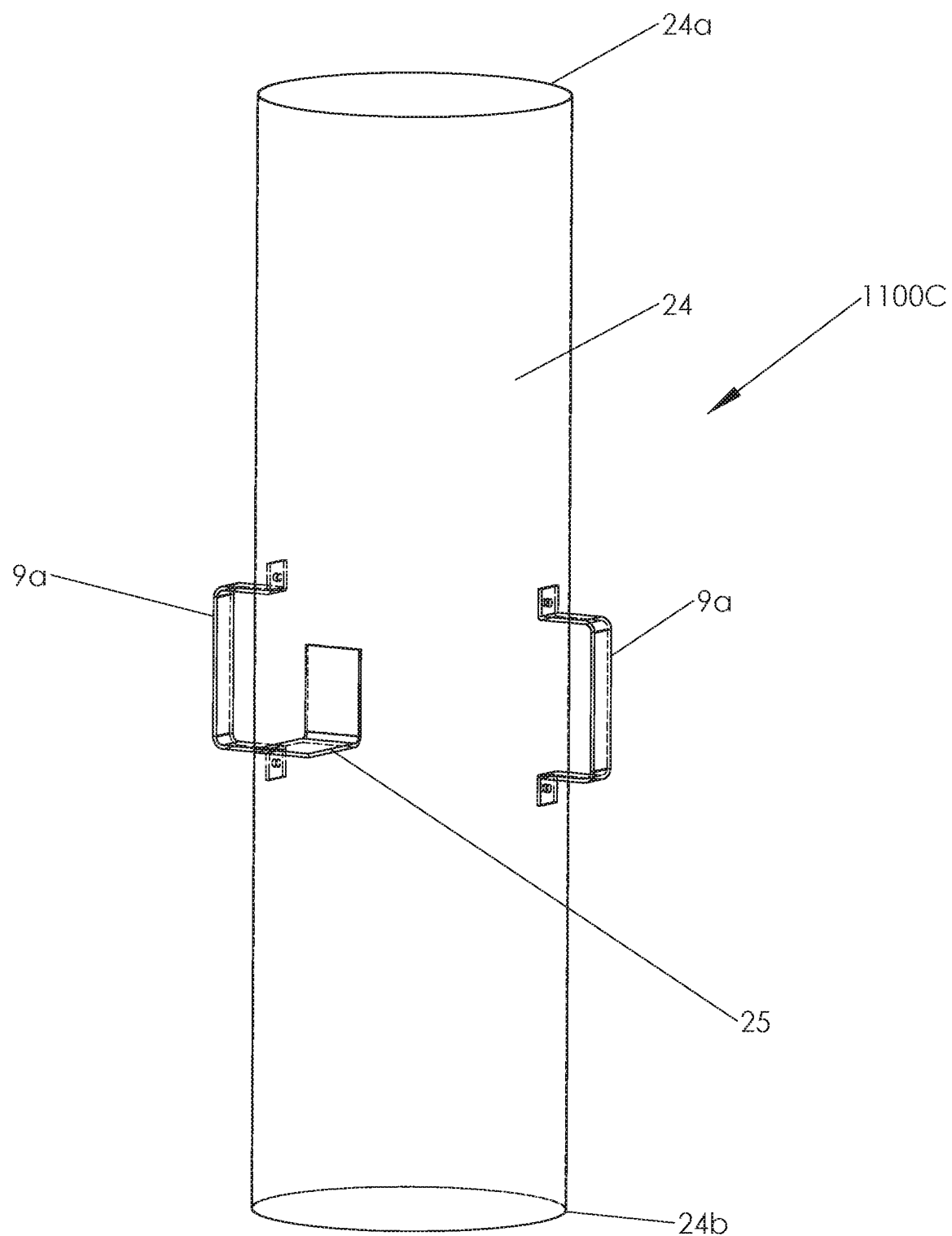
FIG. 12 is a schematic illustration of the extended chimney stack of FIG. 11, constructed according to the present invention.

Located on top of conical top section 3 is extended chimney stack 1100C. As best shown in FIG. 12, extended chimney stack 1100C includes handles 9a, chimney stack 24, chimney stack openings 24a and 24b, and tab 25. The purpose of extended chimney stack 1100C is to enhance the air flow draft through the utilization of a longer chimney stack 24. It is to be understood that the components of extended chimney stack 1100C can be constructed of any suitable, durable material such as aluminum, steel or stainless steel.

Regarding FIG. 11, extended chimney stack 1100C includes at least one strut 22 that is conventionally attached at one end to the upper leg support 13 and the lower leg support by conventional fasteners. The other end of strut 22 is conventionally removably attached to tab 25 by conventional removable fasteners. The purpose of strut 22 is to secure extended chimney stack 1100C to charcoal igniter 1100 so that extended chimney stack 1100C does not easily fall off of charcoal igniter 1100. Also, it is to be understood that extended chimney stack 1100C must be able to be easily removed from strut 22 at tab 25. It is to be understood that once the charcoal 10 has become ignited, extended chimney stack 1100C should be removed.

As discussed above with respect to charcoal igniter 1100, the upper external air flow pipes 20 extend into a mid-portion to an upper portion of the fire chamber 2. In this manner, air is conducted through the upper external air flow pipes 20 so that the air interacts with a mid-portion and/or an upper portion of the charcoal 10 in the fire chamber 2. In addition, due to the fact that external airflow pipes 20 terminate in the atmosphere and extend downwardly, external airflow pipes 20 create their own updraft and draw in cooler, more dense air while not disrupting airflow in the accelerator section 1. It is to be further understood that the other unique aspects of the charcoal igniters 100, 600 and 1000 such as the venturi effect and the ability to use the charcoal igniters 100, 600 and 1000 as a food cooker/heater can equally be applied to charcoal igniter 1100.

In particular, due to the fact that the volume within accelerator section 1 is greater than the volume of fire chamber 2, a net increase in the velocity of the air that passes through lower grate 4, fire chamber 2 and upper external air flow pipes 20 is created when air begins to flow through charcoal igniter 1100 once the charcoal 10 is ignited. Also, due to the fact that accelerator opening 1a is larger in diameter (or cross-section) than a diameter (or cross-section) of fire chamber 2, air velocity at lower grating 4 is increased. Further, due to the fact that charcoal 10 further restricts the open passages in fire chamber 2, the air flow increases as the air goes through the charcoal 10 in the fire chamber 2 on its way up and out of conical tip section opening 3a. In this manner, the convective hot gases flowing upward create more airflow up through accelerator opening 1a. As heat is created in fire chamber 2, an updraft is created within fire chamber 2 and upper external air flow pipes 20. The dimensions and location of fire chamber 2 create a restriction in the air flow which cause the air flow to accelerate even more through fire chamber 2 and upper external air flow pipes 20 which allows the air to be distributed over substantially the entire amount of charcoal 10 located within fire chamber 2 thereby encouraging a quicker and more efficient complete ignition of the charcoal 10.

Figures 13A, 13B:
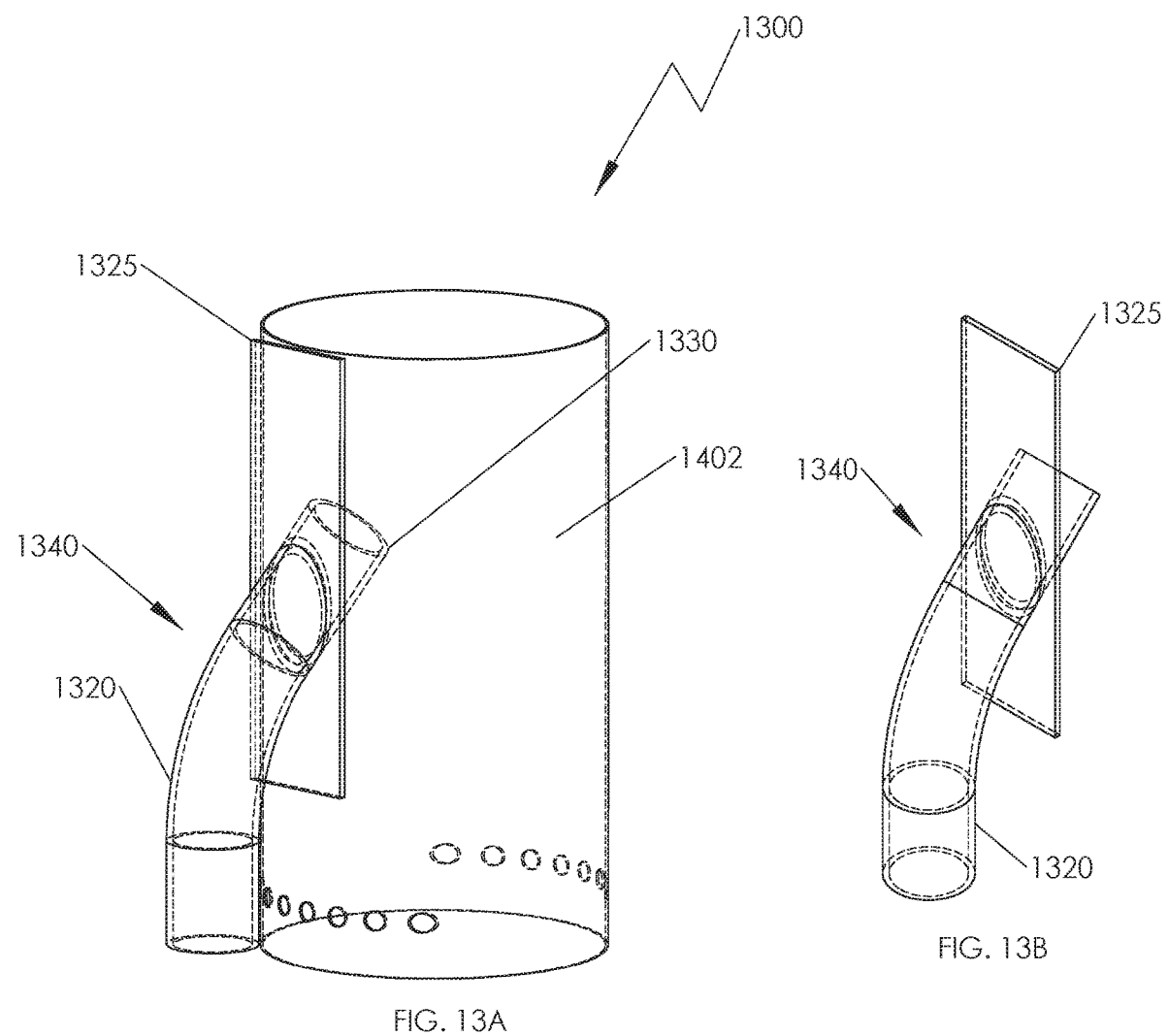
FIG. 13A shows the upper airflow pipe acting as a handle attached to the fire chamber of an igniter.
FIG. 13B shows an upper airflow pipe that has a secondary function as a handle, constructed according to the present invention.

Referring now to FIG. 13A, there is illustrated a charcoal chimney style igniter 1300 with the addition of an upper airflow tube. The upper airflow tube 1320 was shown in other embodiments in the earlier application such as igniter 600, and igniter 1000. The upper airflow pipe 1320 is shown again on a conventional charcoal chimney style igniter. The upper airflow pipe 1320 is hollow and conducts airflow from cool atmospheric air into the fire chamber 1402. The draft created in the fire chamber 1402 draws airflow in. As a byproduct, the cooling effect of the flowing air helps to keep the upper airflow pipe 1320 cooler It has been determined that the upper airflow pipe's secondary feature is as a handle that conducts airflow, called the upper airflow pipe handle 1340 (FIG. 13B). The upper airflow pipe 1320 is attached to the reinforcing bracket 1325 (together referred to as the upper airflow pipe handle 1340). The reinforcing bracket 1325 may be connected to the fire chamber 1402 with conventional fasteners or welding. The upper airflow pipe 1320 and the reinforcing bracket 1325 may be constructed of any durable metal such as steel or stainless steel. The handgrip region of upper airflow pipe 1320 may also have a heat resistant insulation coating (not shown) applied to further protect the user's hand from heat.

Figure 14:
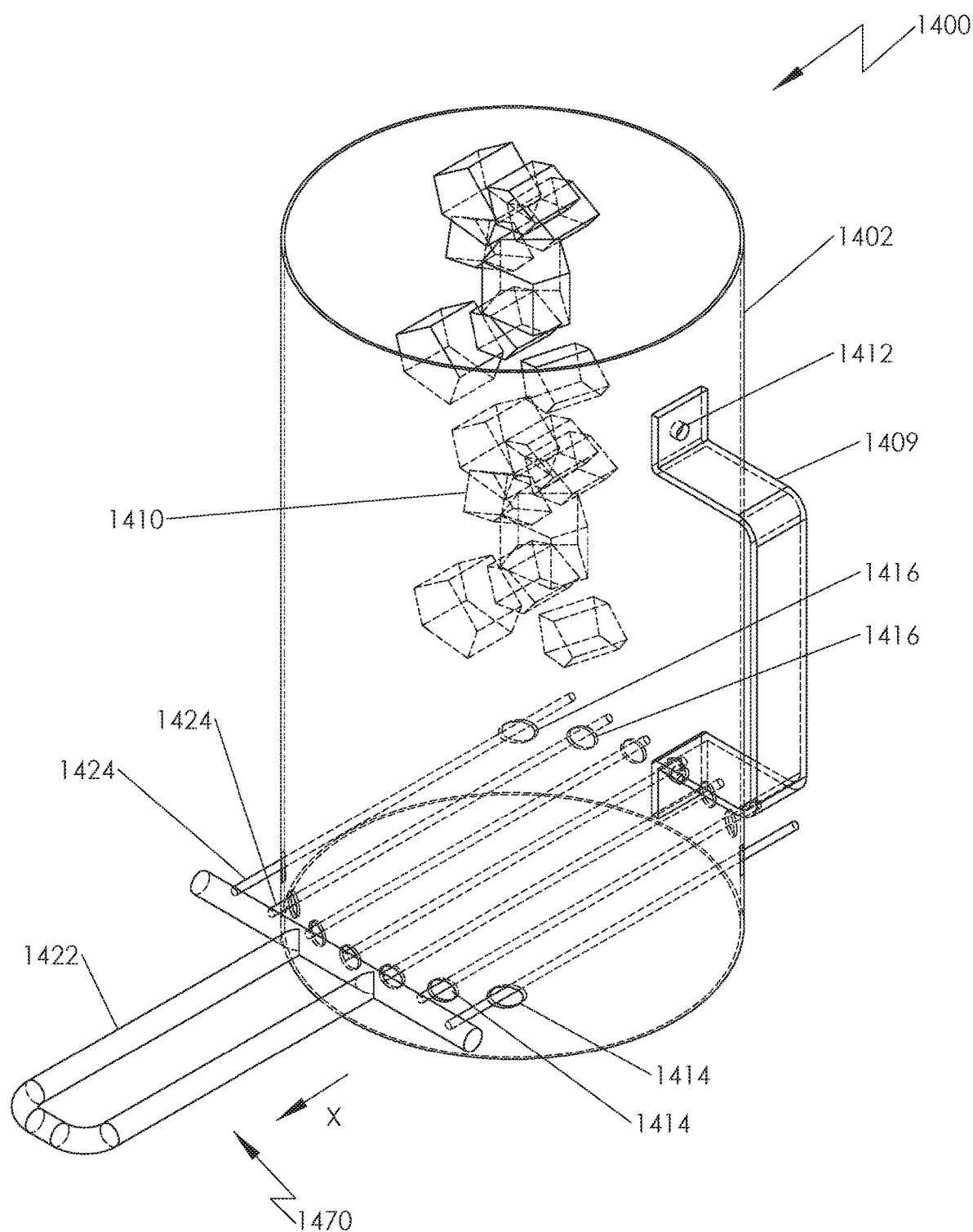
FIG. 14 is a schematic illustration of a charcoal igniter with a first embodiment of a removable/releasable bottom grate, constructed according to the present invention.

Referring now to FIG. 14, there is illustrated a charcoal igniter 1400. It is to be understood that charcoal igniter 1400 can be used in place of upper section 100U, as shown in FIG. 3. In this manner, charcoal igniter 1400 can be used with the lower section 100L of FIG. 3 which includes a venturi and operates in substantially the same manner as charcoal igniter 100, and as igniter 1000 in FIG. 10. It is to be understood that the charcoal igniter 1400 can be used with a venturi in order to more efficiently and quickly ignite the charcoal 1410.

With respect to charcoal igniter 1400, as shown in FIG. 14, charcoal igniter 1400 includes, in part, fire chamber 1402, at least one handle 1409, conventional handle fasteners 1412, a plurality of holes 1414 and 1416, and releasable removable grate 1420. It is to be understood that the various components of charcoal igniter 1400 can be constructed of any suitable, durable material such as aluminum, steel or stainless steel. It is to be understood that fire chamber 1402 also may contain features of igniter 100 such as the conical top section 3, and the optional cooking grate 23. In addition, it is to be understood that charcoal igniter 1400 may contain features of igniter 1000 including the upper external air flow pipes 20, which can serve a secondary function as handles. It is to be even further understood that charcoal igniter 1400 may contain features of igniter 1100, thereby allowing the use of a tall stack as 1100C.

With respect to fire chamber 1402, as will be discussed in greater detail later, fire chamber 1402 is used to hold the charcoal 1410 (FIG. 14) so that the charcoal 1410 can be ignited. It is to be understood that the dimensions of fire chamber 1402 should be such that a sufficient amount of charcoal 1410 can be retained within fire chamber 1402 in order to provide a suitable amount of ignited charcoal 1410 to the user.

With respect to handle 1409, preferably, handle 1409 is conventionally attached to the side of fire chamber 1402 by conventional fasteners 1412. It is to be understood that the size and shape of handle 1409 should be such that the user is able to easily deposit (or dump) the ignited charcoal 1410 from charcoal igniter 1400 by grasping handle 1409 and removing/releasing releasable/removable grate 1420 from charcoal igniter 1400 (in the direction of arrow X) without the user's hands becoming too hot due to being exposed to the ignited charcoal 1410 in the fire chamber 1402.

With respect to releasable/removable grate 1420, releasable/removable grate 1420 is used in conjunction with fire chamber 1402 in order to retain the charcoal 1410 (FIG. 14) within fire chamber 1402. As will be discussed in greater detail below, releasable/removable grate 1420 can be pulled out of holes 1414 and 1416 (in the direction of arrow X) so that the ignited charcoal 1410 can be simply deposited (or dumped) onto a food cooking implement such as a grill (not shown) or the like without having to hold handle 1409, turn over charcoal igniter 1400 and dump the ignited charcoal 1410 onto the grill, as described above with respect to the prior chimney-style charcoal igniters.

Figure 20:
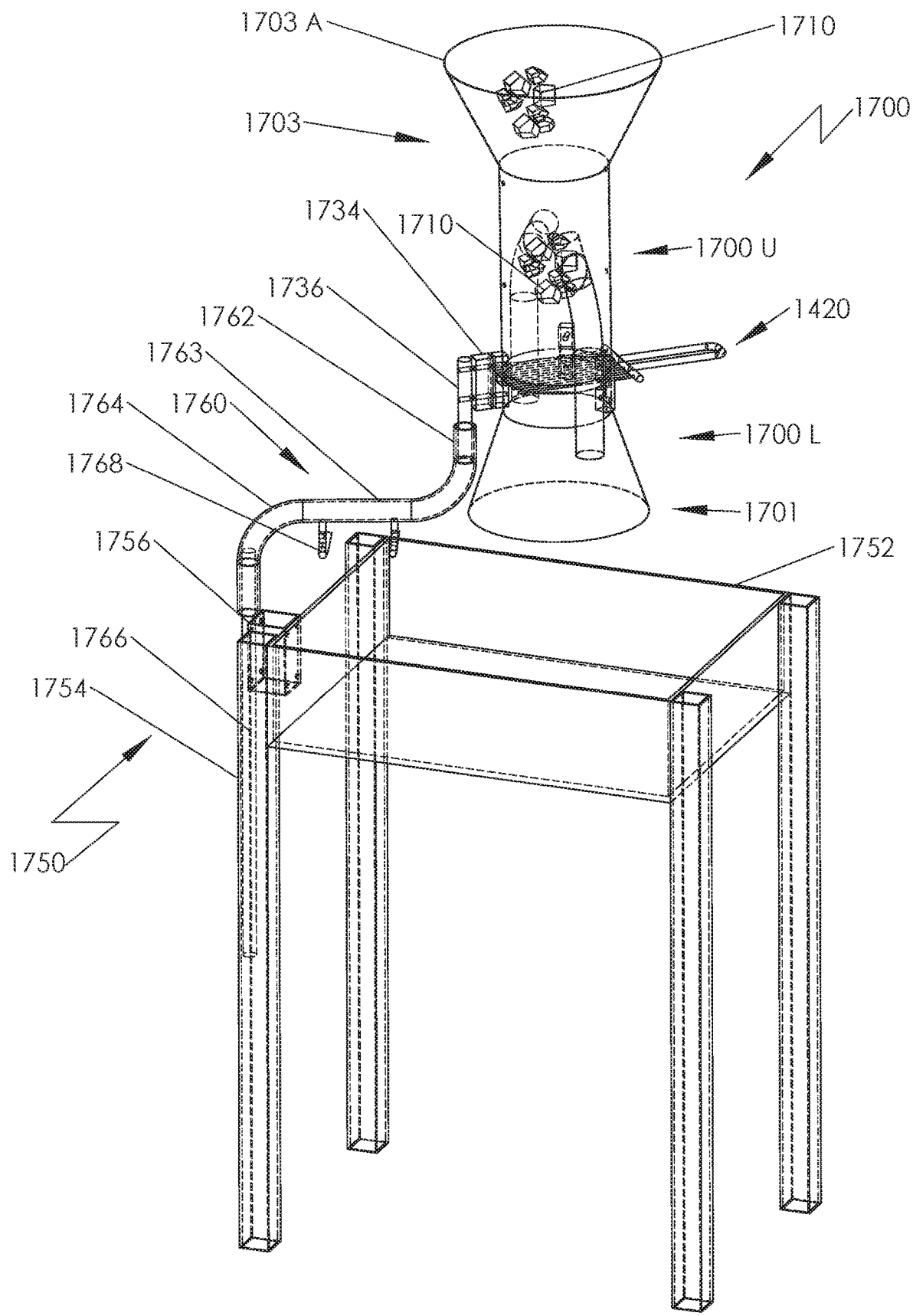
FIG. 20 is a schematic illustration of a charcoal igniter having a venturi showing the fourth embodiment with the removable/releasable bottom grate being inserted within the charcoal igniter and the charcoal igniter being located over a grill, prior to the ignited charcoal being dumped onto the grill, constructed according to the present invention.

It is to be understood that FIG. 14 minus the bottom release grate system (comprised of a removable grate and slots for the grate to be inserted and to be removed) is essentially showing the current art. The bottom release grate system could be applied to the basic charcoal chimney art and be viewed as an improvement in itself. However, if the bottom release grate system is coupled with the other aspects of the present invention, the whole art can be advanced significantly by working along with the science and user methods. A significant advantage of the bottom release grate system is that it affords the ability to extend the fire chamber stack taller to aid in stronger convective draft and more rapid ignition. The bottom release grate works along with the above stated scientific principle and the user's method to allow new things to happen such as being able to safely discharge burning charcoal safely from the bottom of a device with a tall stack and not having to pick up the device. The bottom release grate also opens the way for a new method of using a pivoting arm to aid in the handling of the fire chamber position and grate discharge process overtop a cooking implement. Finally, it is to be understood that this embodiment can be affixed to a pivoting arm 1760, as shown in FIG. 20, by a person skilled in the art.

Figure 15:
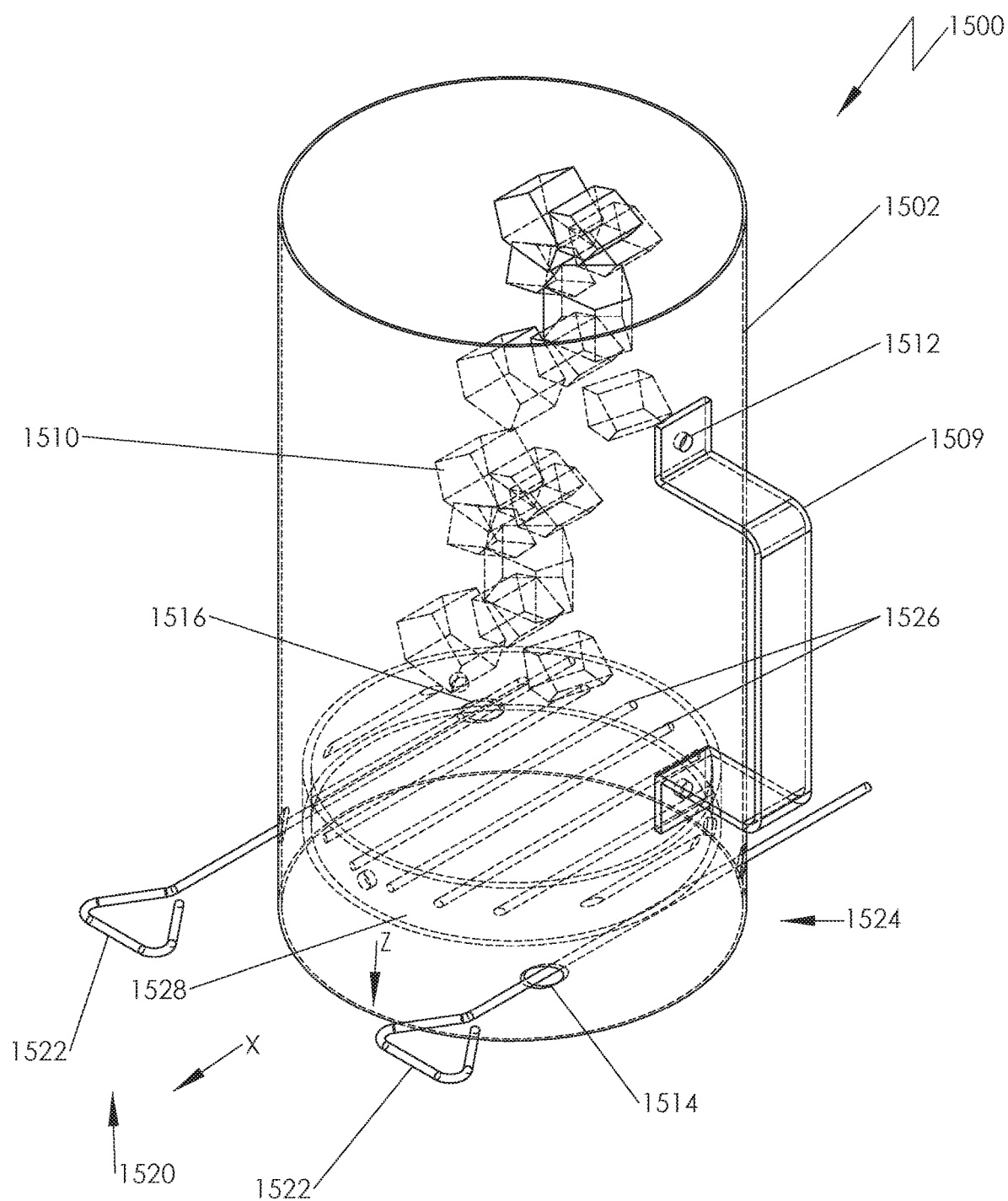
FIG. 15 is a schematic illustration of a charcoal igniter with a second embodiment of a removable/releasable bottom grate, constructed according to the present invention.

Referring now to FIG. 15, there is illustrated another charcoal igniter 1500. It is to be understood that charcoal igniter 1500 can be used in place of upper section 100U, as shown in FIG. 3. In this manner, charcoal igniter 1500 can be used with the lower section 100L of FIG. 3 which includes a venturi and operates in substantially the same manner as charcoal igniter 100. It is to be understood that the charcoal igniter 1500 can be used with a venturi in order to more efficiently and quickly ignite the charcoal 1510.

With respect to charcoal igniter 1500, as shown in FIG. 15, charcoal igniter 1500 includes, in part, fire chamber 1502, at least one handle 1509, conventional handle fasteners 1512, a plurality of holes 1514 and 1516, and releasable/removable grate system 1520. It is to be understood that the various components of charcoal igniter 1500 can be constructed of any suitable, durable material such as aluminum, steel or stainless steel.

With respect to fire chamber 1502, as will be discussed in greater detail later, fire chamber 1502 is used to hold the charcoal 1510 (FIG. 15) so that the charcoal 1510 can be ignited. It is to be understood that the dimensions of fire chamber 1502 should be such that a sufficient amount of charcoal 1510 can be retained within fire chamber 1502 in order to provide a suitable amount of ignited charcoal 1510 to the user.

With respect to handle 1509, preferably, handle 1509 is conventionally attached to the side of fire chamber 1502 by conventional fasteners 1512. It is to be understood that the size and shape of handle 1509 should be such that the user is able to easily deposit (or dump) the ignited charcoal 1510 from charcoal igniter 1500 by grasping handle 1509 and removing/releasing releasable/removable grate system 1520 from charcoal igniter 1500 (in the direction of arrows X and Z) without the user's hands becoming too hot due to being exposed to the ignited charcoal 1510 in the fire chamber 1502.

With respect to releasable/removable grate system 1520, releasable/removable grate system 1520 is used in conjunction with fire chamber 1502 in order to retain the charcoal 1510 (FIG. 15) within fire chamber 1502. As will be discussed in greater detail below, the support rods 1522 of releasable/removable grate system 1520 can be pulled out of holes 1514 and 1516 (in the direction of arrow X) so that the grate 1524 falls out of or away from the bottom of fire chamber 1502 (in the direction of arrow Z), such that ignited charcoal 1510 can be simply deposited (or dumped) onto a food cooking implement such as a grill (not shown) or the like without having to hold handle 1509, turn over charcoal igniter 1500 and dump the ignited charcoal 1510 onto the grill, as described above with respect to the prior, known chimney-style charcoal igniters.

With respect to grate 1524, grate 1524 includes, in part, a plurality of bars 1526 that are spaced apart from each other in order to allow air to flow through the grate 1524 and into fire chamber 1502. It is to be understood that the dimensions and the configurations of the plurality of bars 1526 with respect to each other can be varied as long as air is able to properly flow through grate 1524 and into fire chamber 1502. Also, bars 1526 are conventionally retained in place by bar retainer ring 1528. It is to be further understood that grate 1524 should be constructed of any suitable, durable, high heat resistant material that will not melt or burn such as steel, stainless steel or ceramic.

During the operation of charcoal igniter 1500, after the charcoal 1510 has been properly ignited, the user places the charcoal igniter 1500 onto the charcoal grate of the implement in which the ignited charcoal is to be used such as a charcoal grill (not shown). The user then simply has to remove the support rods 1522 from the holes 1514 and 1516 in charcoal igniter 1500 (in the direction of arrow X) so that grate 1524 falls in the direction of arrow Z which allows the ignited charcoal 1510 to be deposited onto the charcoal grate of the charcoal grill. The user then safely collects the grate 1524 from the ignited charcoal 1510 and sets the grate 1524 in a safe location so that the grate 1524 can properly cool down. Once the grate 1524 has completely cooled down, the user can then place the grate 1524 back into the bottom of charcoal igniter 1500 and locate the support rods 1522 in holes 1514 and 1516 in order to properly retain grate 1524 within charcoal igniter 1500. It is to be understood that this embodiment can be affixed to a pivoting arm 1760, as shown in FIG. 20, by a person skilled in the art.

Figure 16:
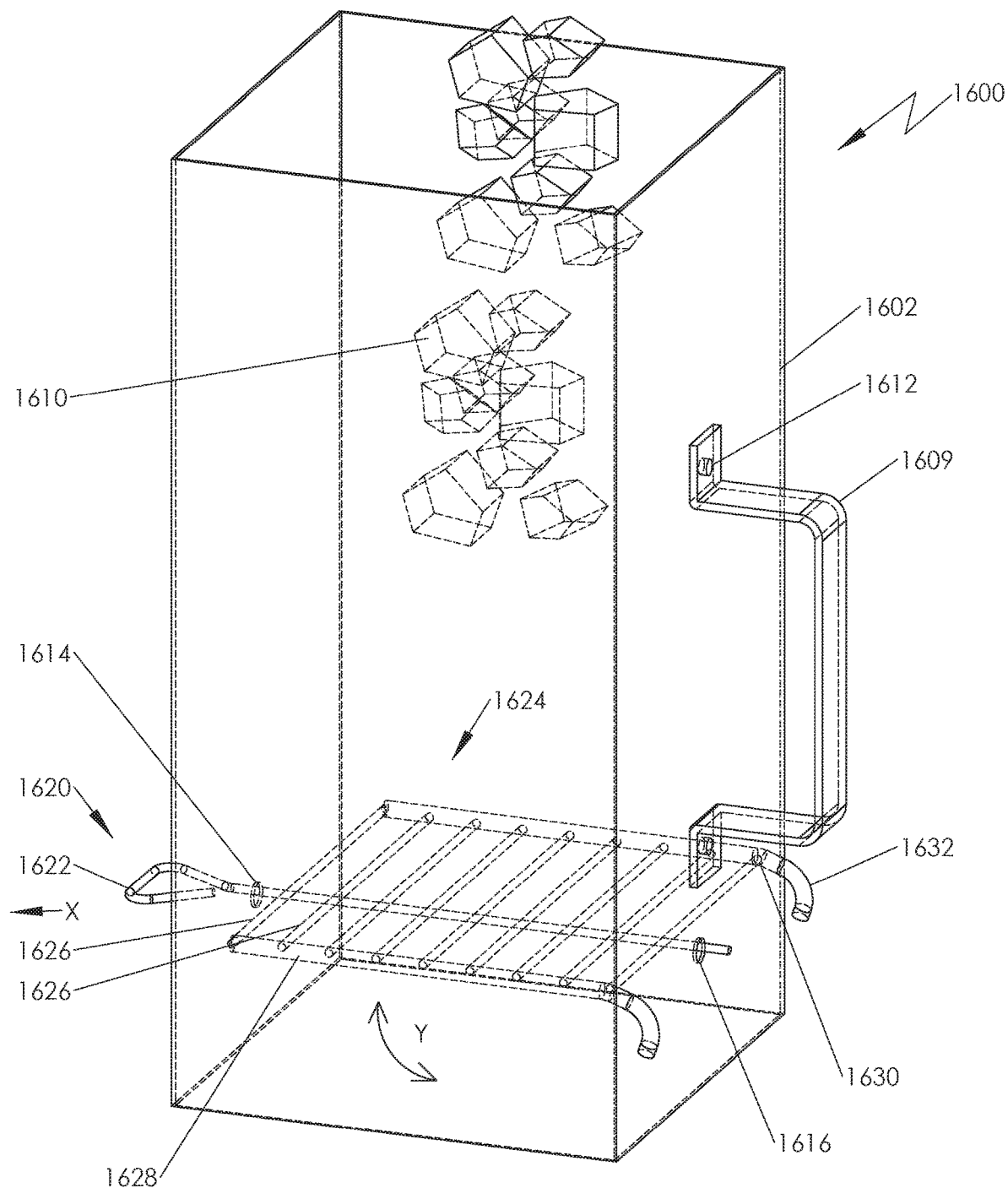
FIG. 16 is a schematic illustration of a charcoal igniter with a third embodiment of a removable/releasable bottom grate, constructed according to the present invention.

Referring now to FIG. 16, there is illustrated still another charcoal igniter 1600. It is to be understood that charcoal igniter 1600 can be used in place of upper section 100U, as shown in FIG. 3. In this manner, charcoal igniter 1600 can be used with the lower section 100L of FIG. 3 which includes a venturi and operates in substantially the same manner as charcoal igniter 100. It is to be understood that the charcoal igniter 1600 can be used with a venturi in order to more efficiently and quickly ignite the charcoal 1610.

With respect to charcoal igniter 1600, as shown in FIG. 16, charcoal igniter 1600 includes, in part, fire chamber 1602, at least one handle 1609, conventional handle fasteners 1612, a plurality of holes 1614 and 1616, and releasable/removable grate system 1620. It is to be understood that the various components of charcoal igniter 1600 can be constructed of any suitable, durable material such as aluminum, steel or stainless steel.

With respect to fire chamber 1602, as will be discussed in greater detail later, fire chamber 1602 is used to hold the charcoal 1610 (FIG. 16) so that the charcoal 1610 can be ignited. It is to be understood that the dimensions of fire chamber 1602 should be such that a sufficient amount of charcoal 1610 can be retained within fire chamber 1612 in order to provide a suitable amount of ignited charcoal 1610 to the user. It is to be understood that the cross-sectional shape of the fire chamber 1602 is non-circular to aid in the grate 1624 swinging downward upon release on the end that is not hinged to the fire chamber 1602.

With respect to handle 1609, preferably, handle 1609 is conventionally attached to the side of fire chamber 1602 by conventional fasteners 1612. It is to be understood that the size and shape of handle 1609 should be such that the user is able to easily deposit (or dump) the ignited charcoal 1610 from charcoal igniter 1600 by grasping the handle 1609 and removing/releasing releasable/removable grate system 1620 from charcoal igniter 1600 (in the direction of arrows X and Y) without the user's hands becoming too hot due to being exposed to the ignited charcoal 1610 in the fire chamber 1602.

With respect to releasable/removable grate system 1620, releasable/removable grate system 1620 is used in conjunction with fire chamber 1602 in order to retain the charcoal 1610 (FIG. 16) within fire chamber 1602. As will be discussed in greater detail below, the support rod 1622 of releasable/removable grate system 1620 can be pulled out of holes 1614 and 1616 (in the direction of arrow X) so that the grate 1624 falls out of or away from the bottom of fire chamber 1602 (in the direction of arrow Y), such that ignited charcoal 1610 can be simply deposited (or dumped) onto a food cooking implement such as a grill (not shown) or the like without having to hold handle 1609, turn over charcoal igniter 1600 and dump the ignited charcoal 1610 onto the grill, as described above with respect to the prior, known chimney-style charcoal igniters.

With respect to grate 1624, grate 1624 includes, in part, a plurality of bars 1626 that are spaced apart from each other in order to allow air to flow through the grate 1624 and into fire chamber 1602. It is to be understood that the dimensions and the configurations of the plurality of bars 1626 with respect to each other can be varied as long as air is able to properly flow through grate 1624 and into fire chamber 1602. Also, bars 1626 are conventionally retained in place by retainer bars 1628. It is to be further understood that grate 1624 should be constructed of any suitable, durable, high heat resistant material that will not melt or burn such as steel, stainless steel or ceramic.

The other end of grate 1624 includes grate extensions 1632 which are located in openings 1630 of fire chamber 1602. As will be discussed in greater detail later, grate extensions 1632 cooperate with openings 1630 to allow grate 1624 to pivot downwardly in the direction of arrows Y to allow the ignited charcoal 1610 to be deposited onto a food cooking implement such as a grill (not shown) or the like.

During the operation of charcoal igniter 1600, after the charcoal has been properly ignited, the user places the charcoal igniter 1600 onto the charcoal grate of the implement in which the ignited charcoal is to be used such as a charcoal grill (not shown). The user then simply has to remove the support rod 1622 from the holes 1614 and 1616 in charcoal igniter 1600 (in the direction of arrow X) so that grate 1624 pivots away from the bottom of charcoal igniter 1600 in the direction of arrow V which allows the ignited charcoal 1610 to be deposited onto the charcoal grate of the charcoal grill. The user then sets the hot charcoal igniter 1600 in a safe location so that the charcoal igniter 1600 can properly cool down. Once the charcoal igniter 1600 has completely cooled down, the user can then pivot the grate 1624 back into the bottom of charcoal igniter 1600 and locate the support rod 1622 in holes 1614 and 1616 in order to properly retain grate 1624 within charcoal igniter 1600. It is to be understood that this embodiment can be affixed to a pivoting arm 1760, as shown in FIG. 20, by a person skilled in the art.

Figure 17:
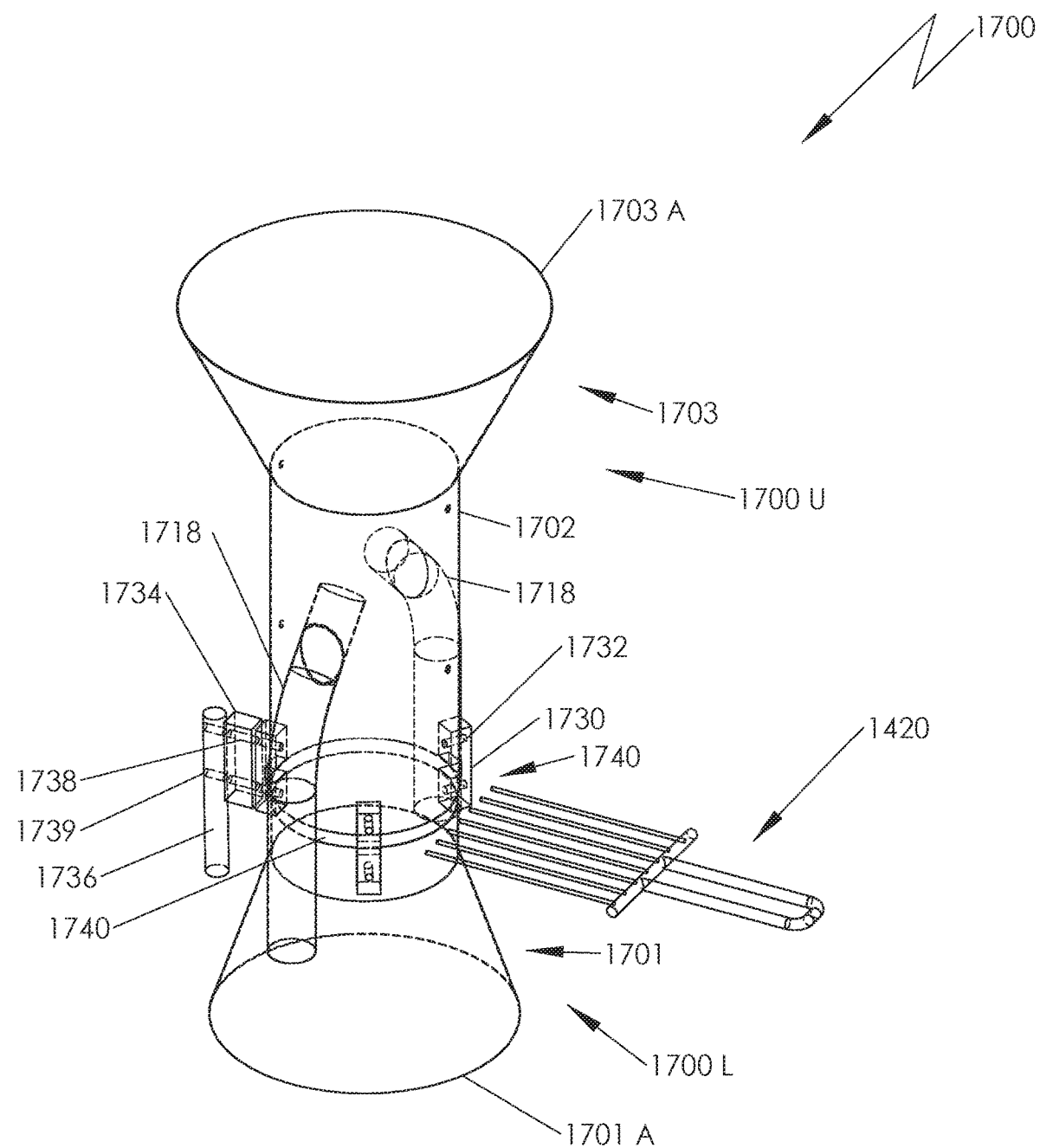
FIG. 17 is a schematic illustration of a charcoal igniter having a venturi with a fourth embodiment of a removable/releasable bottom grate, constructed according to the present invention.

Regarding FIG. 17, there is illustrated another embodiment of the charcoal igniter 1700. Referring now more particularly to FIG. 17, charcoal igniter 1700, includes, in part, upper section 1700U and lower section 1700L. With respect to lower section 1700L, as shown in FIG. 17, lower section 100L includes, in part, accelerator section 1701. It is to be understood that the various components of lower section 1700L can be constructed of any suitable, durable material such as aluminum, steel or stainless steel.

With respect to accelerator section 1701, accelerator section 1701 is attached to fire chamber 1702 by brackets 1730 and conventional fasteners 1732. As shown in FIG. 17, accelerator section 1701 includes an opening 1701*a*. It is to be understood that this opening 1701*a* must be bigger in diameter (or cross-section) than the diameter (or cross-section) of the fire chamber 1702 in order to provide the proper venturi effect in charcoal igniter 1700. It is to be further understood that the fire chamber 1702, as shown in FIG. 17, is constructed of the same materials as the fire chamber 2 illustrated in FIG. 1. It is to be even further understood that except for the use of the upper external airflow pipes 1718, and the bottom release grate comprised of opening 1740, and grate 1420, charcoal igniter 1700 is constructed in substantially the same manner as charcoal igniter 100, 600, and 1000 and operates in substantially the same manner as charcoal igniter 100, 600 and 1000. Igniter 1700 is not pictured with supporting legs (FIGS. 23A and 24A), instead it has an alternative supporting mechanism attached to leg 1736, thus without the legs, the conical accelerator section 1701 is attached differently than igniter 100, 600, or 1000.

With respect to upper section 1700U, upper section 1700U includes upper external air flow pipes 1718. Upper external air flow pipes 1718 are conventionally attached to openings in a mid-portion of the fire chamber 1702 by conventional techniques such as welding or through the use of conventional fasteners. It is to be further understood that the diameters of upper external air flow pipes 1718 should be of the proper size in order to provide proper air flow through upper external air flow pipes 1718.

Upper section 1700U also includes an opening 1740 between fire chamber 1702 and accelerator section 1701. Opening 1740 is formed in charcoal igniter 1700 through the use of brackets 1730 and conventional fasteners 1732. As can be seen in FIG. 17, a plurality of brackets 1730 are secured at equally spaced locations around the periphery of the accelerator section 1701 and fire chamber 1702 by conventional fasteners 1732. An opening 1740 is consequently formed between fire chamber 1702 and accelerator section 1701 that allows the removable releasable grate 1420 to be located within charcoal igniter 1700, as will be described in greater detail later. It is to be further understood that brackets 1730 should be constructed of any suitable, durable, high heat resistant material that will not melt or burn such as steel or stainless steel.

Located on one of the brackets 1730 is a support bracket 1734 and a support leg 1736. As will be discussed in greater detail later, support bracket 1734 and support leg 1736 will be used to support charcoal igniter 1700. As shown in FIG. 17, support bracket 1734 is attached to bracket 1730 by conventional fasteners 1738. Also, support leg 1736 is attached to support bracket 1734 by conventional fasteners 1740. It is to be further understood that bracket 1734 and support leg 1736 should be constructed of any suitable, durable, high heat resistant material that will not melt or burn such as steel or stainless steel.

Figure 18:
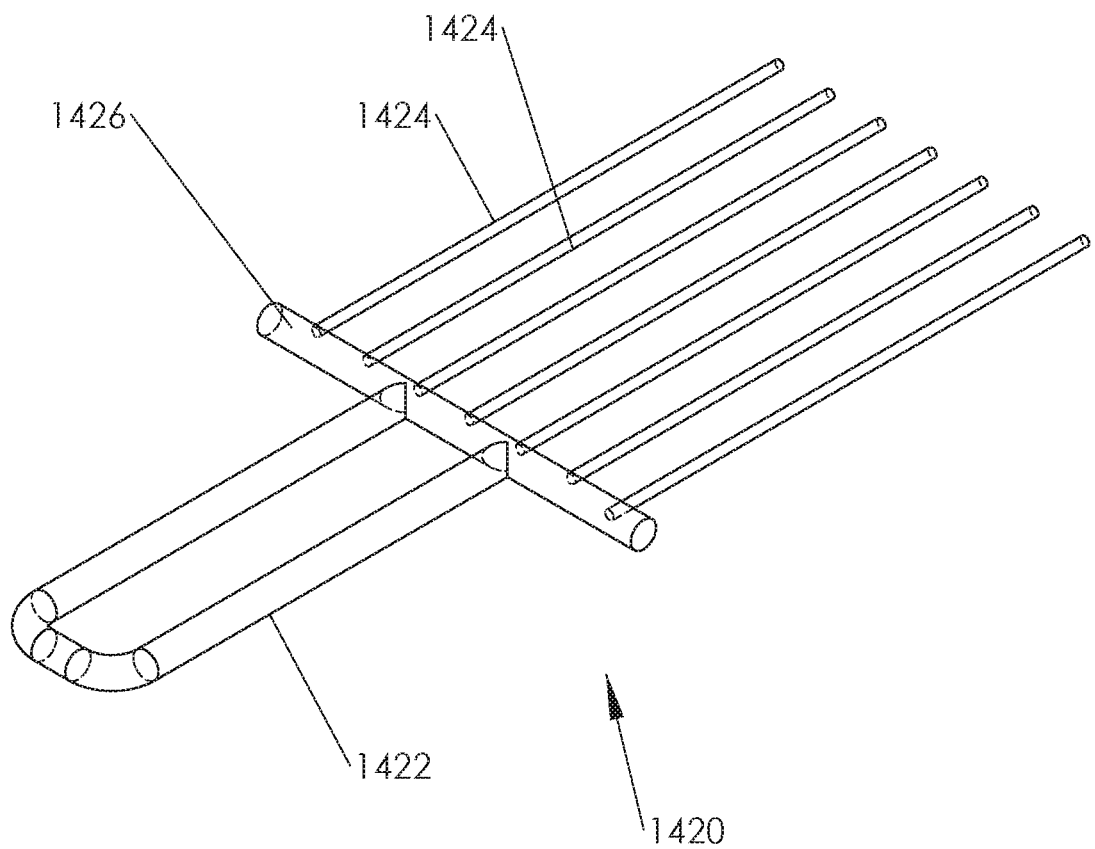
FIG. 18 is a schematic illustration of a removable/releasable bottom grate for use in connection with the embodiments shown in FIGS. 14 and 17, constructed according to the present invention.

With respect to FIG. 18, there is illustrated removable/releasable grate 1420. Removable/releasable grate 1420, includes, in part, a plurality of bars 1424 that are spaced apart from each other in order to allow air to flow through the removable releasable grate 1420 and into fire chamber 1702 (FIG. 17 and fire chamber 1402 in FIG. 14). It is to be understood that the dimensions and the configurations of the plurality of bars 1424 with respect to each other can be varied as long as air is able to properly flow through removable/releasable grate 1420 and into fire chamber 1702 (FIG. 17 and fire chamber 1402 in FIG. 14). Bars 1424 are conventionally attached to a retainer bar 1426 and retainer bar 1426 is conventionally attached to grate handle 1422. Bars 1424 are oriented parallel with the direction of motion of the grate in the slot so they do not catch on the charcoal chunks when pulled out. The bars 1424 act as fingers that are retracted to cause release of the charcoal. It is to be further understood that removable releasable grate 1420 should be constructed of any suitable, durable, high heat resistant material that will not melt or burn such as steel, ceramic or stainless steel.

Figure 19:
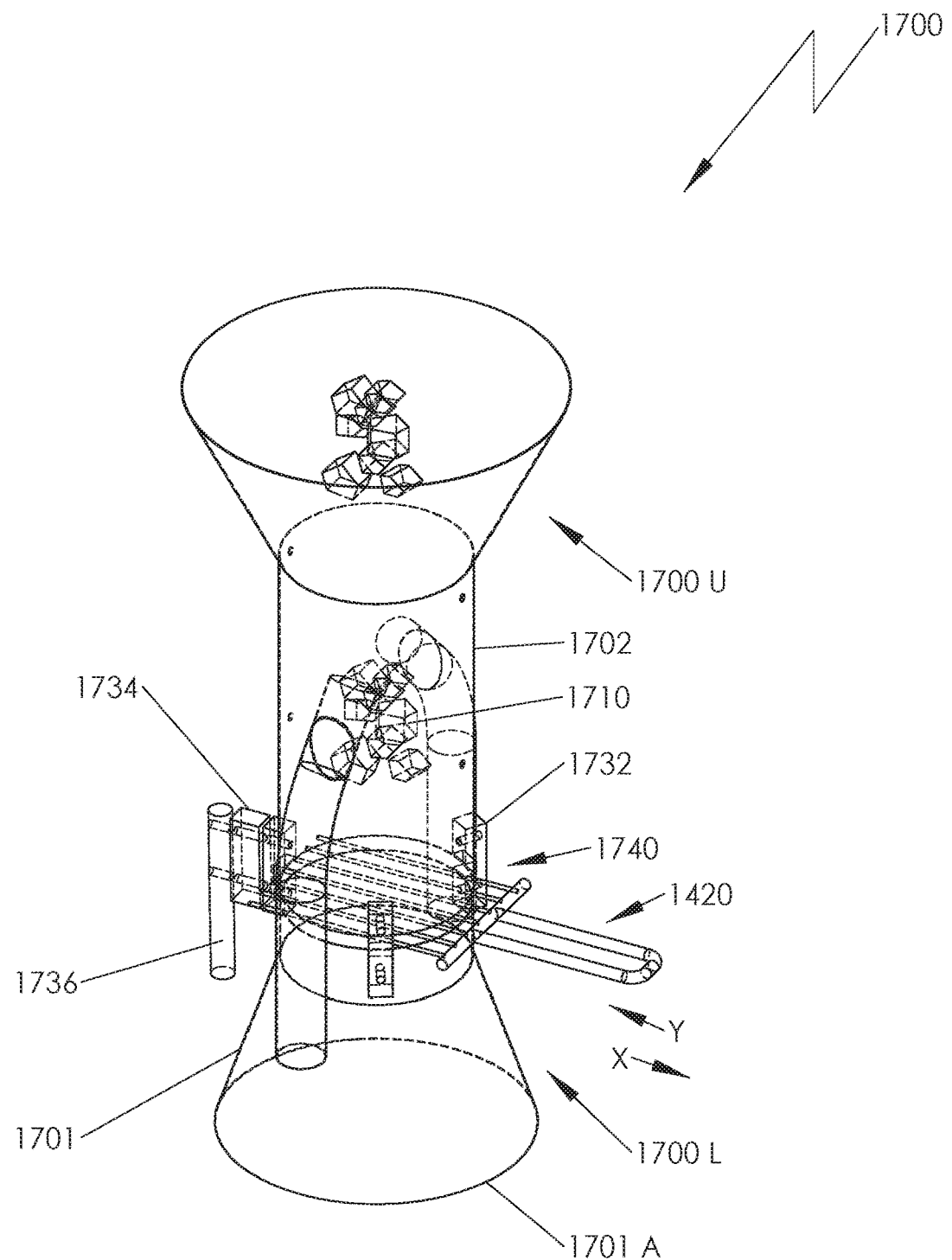
FIG. 19 is a schematic illustration of a charcoal igniter having a venturi showing the fourth embodiment with the removable/releasable bottom grate being inserted within the charcoal igniter, constructed according to the present invention.

With respect to FIG. 19, the placement of removable/releasable grate 1420 into charcoal igniter 1700 is shown. During the operation of charcoal igniter 1700, after the charcoal 1710 has been properly ignited, the user places the charcoal igniter 1700 over the charcoal grate of the implement in which the ignited charcoal is to be used such as a charcoal grill (not shown). The user then simply has to remove the removable/releasable grate 1420 from the opening 1740 in charcoal igniter 1700 (in the direction of arrow X) which allows the ignited charcoal 1710 to be deposited onto the charcoal grate of the charcoal grill. The user can then place the removable/releasable grate 1420 back into the opening 1740 (in the direction of arrow Y) and move the charcoal igniter 1700 away from the charcoal grill, as will be described in detail later.

Regarding FIG. 20, there is illustrated an embodiment for supporting charcoal igniter 1700 over a cooking implement 1750 such as a charcoal grill. In this embodiment, the charcoal 1710 can be ignited in charcoal igniter 1700, as discussed above, and then the charcoal 1710 can be simply deposited (or dumped) into cooking implement 1750 without having to turn over charcoal igniter 1700 and dump the ignited charcoal 1710 onto the grill, as described above with respect to the prior, known chimney-style charcoal igniters.

As shown in FIG. 20, charcoal igniter 1700 includes upper section 1700U and lower section 1700L. As discussed earlier, upper section 17000 includes support bracket 1734 and support leg 1736 that are used to support charcoal igniter 1700 over cooking implement 1750.

As further shown in FIG. 20, cooking implement 1750 includes, in part, charcoal holder 1752, support legs 1754, and support retainer 1756. It is to be understood that charcoal holder 1752 is used to hold the ignited charcoal 1710 that has been properly ignited by charcoal igniter 1700. Support legs 1754 and support retainer 1756 are attached to charcoal holder 1752 by conventional techniques such as welding, soldering or mechanical fasteners. It is to be understood that support retainer 1756 is used to provide support for pivoting support 1760 as pivoting support 1760 is retained in support leg 1754 and as extension 1766 rotates within support retainer 1756 as will be discussed in greater detail later. It is to be further understood that charcoal holder 1752, support legs 1754, and support retainer 1756 should be constructed of any suitable, durable, high heat resistant material that will not melt or burn such as steel or stainless steel.

Attached to extension 1766 and support leg 1736 is pivoting support 1760. Pivoting support 1760 includes, in part, curved extensions 1762 and 1764 connected by a horizontal section 1763 and extension 1766. It is to be understood that curved extensions 1762, 1764, horizontal section 1763 and upright extension 1766 should be constructed of any suitable, durable, high heat resistant material that will not melt or burn such as steel or stainless steel. It is also to be understood that curved extensions 1762 and 1764, horizontal section 1763, and extension 1766 are connected together by conventional techniques such as welding or soldering in order to form pivoting support 1760. Support 1736 pivots inside of curved extension 1762. Located along a length of curved extension 1762 are a plurality of hooks 1768 which can be used to conventionally hold various cooking tools to be used in conjunction with cooking food on cooking implement 1750. It is to be understood that extended chimney stack 1800C of FIG. 23 and FIG. 24 may be used as optional equipment on igniter 1700 using attaching strut 1822. The charcoal 1710 would be placed inside igniter 1700, then the extended chimney stack 1800C would be placed on the strut 1822.

Figure 21:
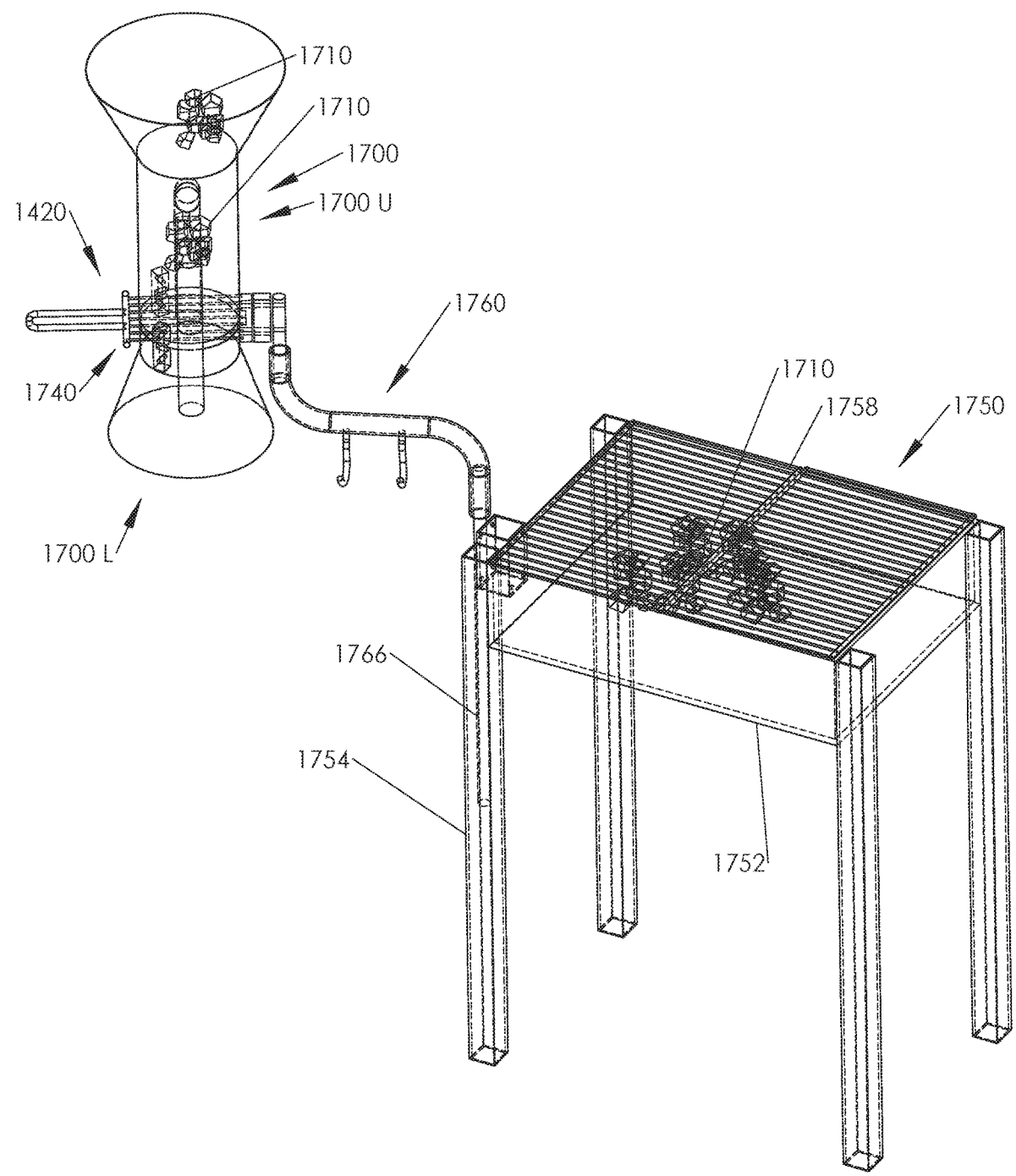
FIG. 21 is a schematic illustration of a charcoal igniter having a venturi showing the fourth embodiment with the removable/releasable bottom grate being inserted within the charcoal igniter and the charcoal igniter being located away from a grill, after the "first batch" of ignited charcoal has been dumped onto the grill, and a "second batch" of unburned charcoal has been placed into the igniter for a second ignition sequence, constructed according to the present invention.

With respect to FIG. 21, charcoal igniter 1700 is shown after the charcoal 1710 has been deposited onto the charcoal holder 1752 of cooking implement 1750. In particular, as discussed above, during the operation of charcoal igniter 1700, the user places the charcoal igniter 1700 over the charcoal grate of the cooking implement 1750 in which the ignited charcoal 1710 is to be used such as a charcoal grill. Once the charcoal 1710 has been properly ignited, the user simply has to remove the removable releasable grate system 1420 from the opening 1740 in charcoal igniter 1700 (in the direction of arrow X as shown in FIG. 19) which allows the ignited charcoal 1710 to be deposited onto the charcoal holder 1752. The user can then place the removable/releasable grate system 1420 back into the opening 1740 (in the direction of arrow Y in FIG. 19) and move the charcoal igniter 1700 away from the charcoal grill, as shown in FIG. 21 which causes extension 1766 to rotate in support leg 1754. In this manner, the user should not come into direct contact with charcoal igniter 1700 while the user is using cooking implement 1750. After the charcoal igniter 1700 has been moved away from cooking implement 1750, the user then simply places a conventional cooking grate 1758 on the cooking implement 1750 so that the cooking grate 1758 is located over the ignited charcoal 1710. It should be noted that in FIG. 21, igniter 1700 is showing charcoal inside 1710. Igniter 1700 is shown as being re-loaded with a second batch of charcoal 1710 such that this second batch of charcoal 1710 can be ignited in case the user of the cooking implement 1750 needs a recharge of hot ready charcoal 1710. This is often the case where a charcoal cooking implement needs more ready charcoal to continue cooking, especially when cooking something that takes several hours such as slow roasting meat. The process for the user is to simply move the cooking grate 1758 and pivot the igniter 1700 into place and dump a second batch of charcoal 1710 into the cooking implement 1750.

Figure 22:
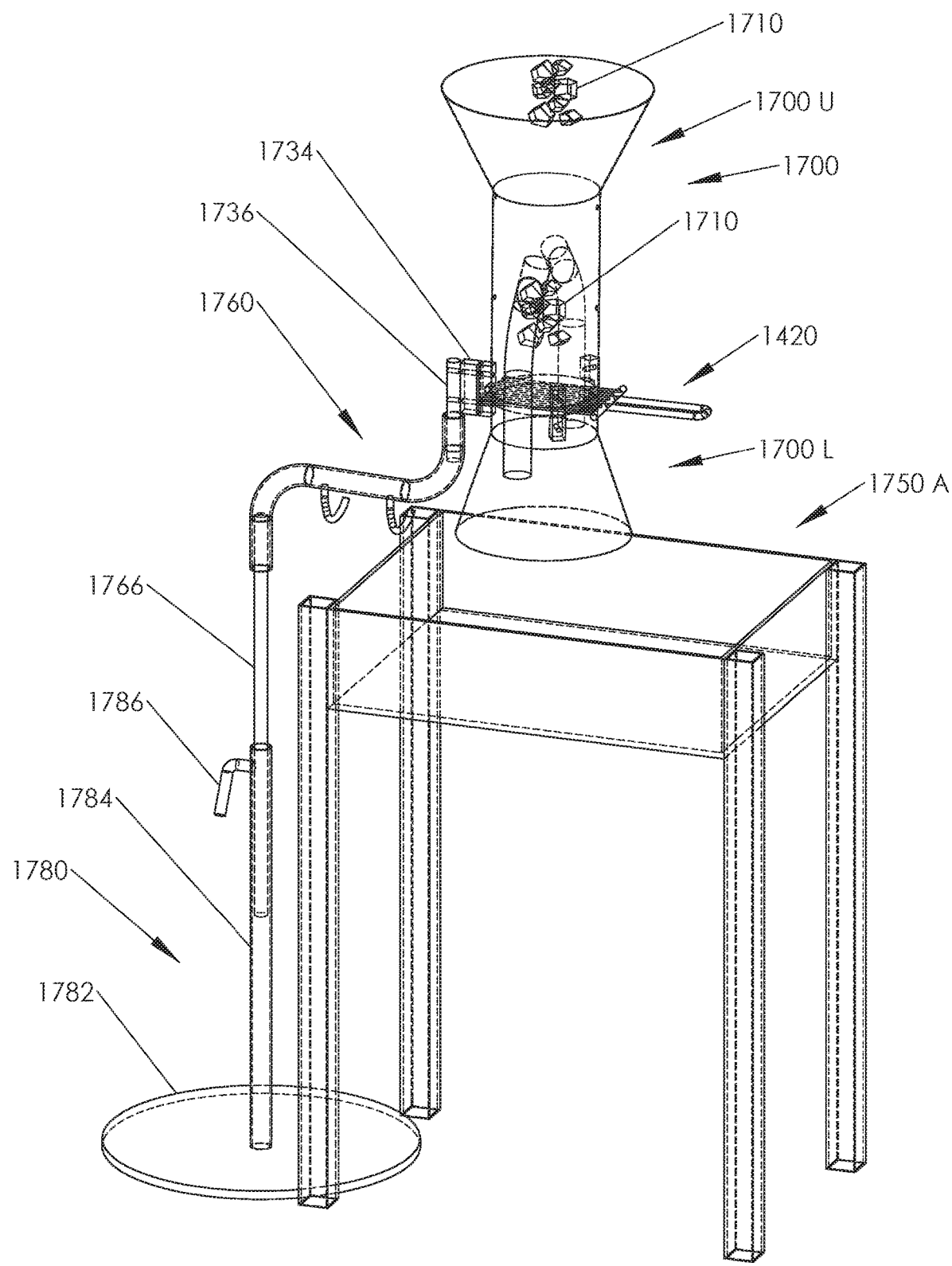
FIG. 22 is a schematic illustration of a charcoal igniter having a venturi showing the fourth embodiment with the removable/releasable bottom grate being inserted within the charcoal igniter and the charcoal igniter being located over a grill, prior to the ignited charcoal being dumped onto the grill, according to another embodiment of the charcoal igniter support, according to the present invention.

With respect to FIG. 22, there is illustrated another embodiment for supporting charcoal igniter 1700 over a cooking implement 1750 such as a charcoal grill. In this embodiment, the charcoal 1710 can be ignited in charcoal igniter 1700, as discussed above and then the charcoal can be simply deposited (or dumped) into cooking implement 1700 without having to turn over charcoal igniter 1700 and dump the ignited charcoal 1710 onto the grill, as described above with respect to the prior, known chimney-style charcoal igniters.

As shown in FIG. 22, charcoal igniter 1700 includes upper section 1700U and lower section 1700L. As discussed earlier, upper section 1700U includes support bracket 1734 and support leg 1736 that are used to support charcoal igniter 1700 over cooking implement 1750a.

As further shown in FIG. 22, cooking implement 1750a is substantially the same cooking implement 1750 as discussed above with respect to FIGS. 20 and 21 except that cooking implement 1750a does not include support retainer 1756 (FIGS. 20 and 21).

Figures 25A, 25B:
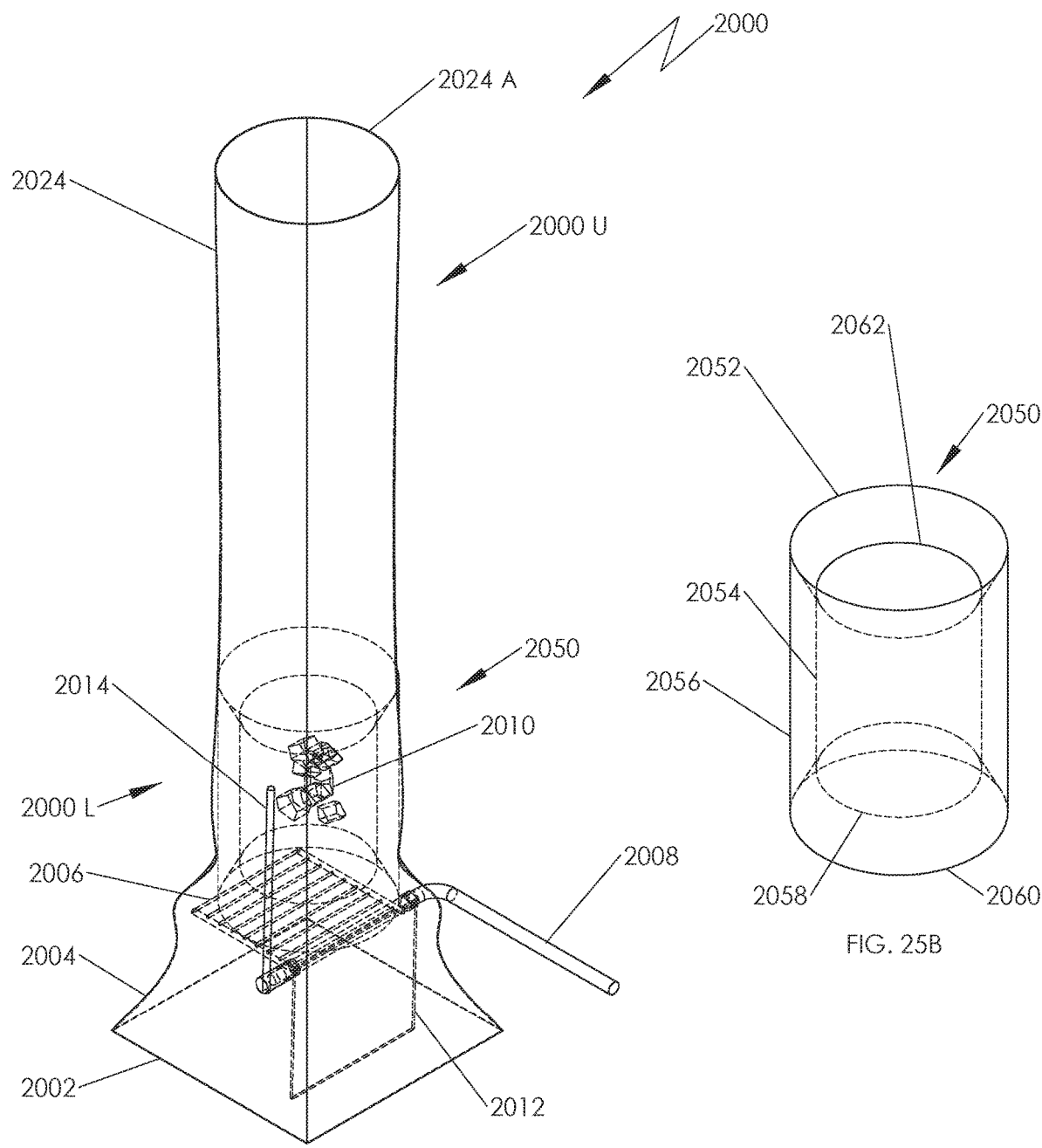
FIG. 25A is a schematic illustration of still another embodiment of the charcoal igniter having a refractory insert venturi with a removable/releasable bottom grate, wherein this embodiment includes an extended chimney stack, constructed according to the present invention.
FIG. 25B is a schematic illustration of the refractory insert for use in conjunction with the charcoal igniter of FIG. 25A, constructed according to the present invention.

In order to support charcoal igniter 1700, support system 1780 is utilized. As shown in FIG. 22, support system 1780 includes, in part, support base 1782, support extension 1784 and extension lock 1786. It is also to be understood that support base 1782 and support extension 1784 are connected together by conventional techniques such as welding, soldering, or threading. Furthermore, it is to be understood that support base 1782, support extension 1784 and extension lock 1786 should be constructed of any suitable, durable, high heat resistant material that will not melt or burn such as steel or stainless steel. Base 1782 could be constructed of pre-cast concrete, with the important consideration being a proper size/weight of base 1782 being capable of supporting igniter 1700, igniter 1800 (FIG. 23A with truncated legs) or igniter 1900 (FIG. 24A with truncated legs), or igniter 2000 (FIG. 25A).

During the operation of support system 1780, extension 1766 is placed within support extension 1784 such that the desired height of charcoal igniter 1700 above cooking implement 1750 is achieved. Once the desired height has been achieved, the user simply locks the extension 1766 in place with respect to support extension 1784 by conventionally operating extension lock 1786. It is also to be understood that the location of the charcoal igniter 1700 with respect to the cooking implement 1750 can be changed by adjusting the distance between support system 1780 and cooking implement 1750. After the extension 1766 has been locked in place in support extension 1784, the user can then proceed with igniting the charcoal 1710, depositing the properly ignited charcoal 1710 into cooking implement 1750 and pivoting charcoal igniter 1700, as discussed above.

Regarding FIG. 23A, there is illustrated another embodiment of the charcoal igniter 1800. Charcoal igniter 1800, includes, in part, upper section 1800U, lower section 1800L, and extended chimney stack 1800C. With respect to lower section 1800L, as shown in FIG. 23A, lower section 1800L includes, in part, accelerator section 1801, opening 1801a, ash collection pan 1805, a plurality of support legs 1806, and lower leg support 1814. It is to be understood that the various components of lower section 1800L can be constructed of any suitable, durable material such as aluminum, steel or stainless steel. It is to be further understood that the fire chamber 1802, as shown in FIG. 23A, is constructed of the same materials as the fire chamber 2 illustrated in FIG. 1. It is to be even further understood that except for the use of the extended chimney stack 1800C, and releasable/removable grate 1420 as discussed below, charcoal igniter 1800 is constructed in substantially the same manner as charcoal igniter 1000 and operates in substantially the same manner as charcoal igniter 1000.

Located on top of conical top section 1803 is extended chimney stack 1800C. Extended chimney stack 1800C includes handles 1809a, chimney stack 1824, chimney stack openings 1824*a* and 1824*b*, and tab 1825. The purpose of extended chimney stack 1800C is to enhance the air flow draft through the utilization of a longer chimney stack 1824. It is to be understood that the components of extended chimney stack 1800C can be constructed of any suitable, durable material such as aluminum, steel or stainless steel.

Regarding FIG. 23A extended chimney stack 1800C includes at least one strut 1822 that is conventionally attached at one end to the upper leg support 1813 and the lower leg support 1814 by conventional fasteners. The other end of strut 1822 is conventionally removably attached to tab 1825. Tab 1825 is attached to chimney stack 1824 by conventional removable fasteners. The purpose of strut 1822 is to secure extended chimney stack 1800C to charcoal igniter 1800 so that extended chimney stack 1800C does not easily fall off of charcoal igniter 1800. Also, it is to be understood that extended chimney stack 1800C must be able to be easily removed from strut 1822 at tab 1825. It is to be understood that this embodiment allows three options for discharging the burning charcoal: first, the releasable/removable grate 1420 may be actuated to discharge the charcoal out of the bottom of the fire chamber 1802 and the charcoal 1810 falls out of the opening of the accelerator section 1801 and is deposited in the charcoal and ash collection pan 1805. Secondly, the user may remove the chimney stack 1800C, then remove the fire chamber 1802 with releasable/removable grate 1420 still in place and retained on the bottom of the fire chamber 1802, transport the fire chamber 1802 over to a cooking implement 1750 (FIG. 22, for example) and then actuate the releasable/removable grate 1420, which releases charcoal out of the bottom of the fire chamber 1802. Third, the user may remove and transport the fire chamber 1802 over to a cooking implement 1750 (in FIG. 22) and tip fire chamber 1802 over and dump the charcoal 1810 out of the opening of conical tip section opening 1803*a*. The first two options for discharging are preferable with the new technology of the releasable/removable crate 1420. When not in use, igniter 1800 allows the fire chamber 1802 and chimney stack 1800C to be removed from the legs 1806 for more compact storage.

It is to be further understood that the other unique aspects of the charcoal igniters 100, 600 and 1000 such as the venturi effect and the ability to use the charcoal igniters 100, 600 and 1000 as a food cooker/heater can equally be applied to charcoal igniter 1800. If the user were planning to cook directly over igniter 1800, the extended chimney stack 1800C would be removed by the user, next the user would place the cooking grate 23 (as shown in FIG. 1) over igniter 1800 conical top section opening 1800*a*. It is to be understood that the releasable/removable grate 1420 would remain in place to retain the charcoal 1810 in the fire chamber 1802 for cooking purposes.

In particular, due to the fact that the volume within accelerator section 1801 is greater than the volume of fire chamber 1802, a net increase in the velocity of the air that passes through releasable/removable grate system 1420 and fire chamber 1802 is created when air begins to flow through charcoal igniter 1800 once the charcoal 1810 is ignited. Also, due to the fact that accelerator opening 1801*a* is larger in diameter (or cross-section) than a diameter (or cross-section) of fire chamber 1802, air velocity at releasable/removable grate system 1420 is increased. Further, due to the fact that charcoal 1810 further restricts the open passages in fire chamber 1802, the air flow increases as the air goes through the charcoal 1810 in the fire chamber 1802 on its way up and out of conical tip section opening 1803*a*. In this manner, the convective hot gases flowing upward create more airflow up through accelerator opening 1801*a*. As heat is created in fire chamber 1802, an updraft is created within fire chamber 1802. The dimensions and location of fire chamber 1802 create a restriction in the air flow which causes the air flow to accelerate even more through fire chamber 1802, which allows the air to be distributed over substantially the entire amount of charcoal 1810 located within fire chamber 1802 thereby encouraging a quicker and more efficient complete ignition of the charcoal 1810. It is to be understood that fire chamber 1802 can be constructed to include upper air flow pipes 20, as igniter 1000 in FIG. 10. Although handles 1809 are shown, the upper airflow pipes 20, as in igniter 1000 in FIG. 10, can also serve as handles.

Another unique aspect of the present invention is the use of fire chamber support brackets 1850, as shown in FIG. 23B. Fire chamber support brackets 1850 include, in part, bracket base 1852, fastener hole 1854 and bracket ledge 1856. It is to be understood that the components of fire chamber support brackets 1850 can be constructed of any suitable, durable material such as aluminum, steel or stainless steel. These fire chamber support brackets 1850 are to be attached to lower leg support 1814 as a support stop for the fire chamber 1802. If grate support ring 1816 is not used, the brackets 1850 would be used. Fire chamber support brackets 1850 can be used optionally with the grate support ring 1816. When used, the fire chamber support brackets 1850 provide support on ledge 1856. It is to be understood that the grate support ring 1816 and the fire chamber brackets 1830 may be eliminated and have the fire chamber 1802 sit on support brackets 1850, though doing so will hinder the ability to remove the fire chamber 1802 and releasable removable grate as one system from the support legs to transport it with a load of charcoal 1810 inside the fire chamber 1802.

As shown more clearly in FIGS. 23A and 23C, fire chamber support is provided with brackets 1830 to create opening 1740. The grate support ring 1816 rests on either the lower leg support 1814, or upon brackets 1850 depending upon the dimensions, in either case the grate support ring 1816, and brackets 1830 support the fire chamber 1802 above the releasable/removable grate 1420. The fire chamber 1802 has bracket 1830 attached to the bottom of the fire chamber 1802. The top of bracket 1830 attaches to the bottom of fire chamber 1802 and the bottom of bracket 1830 is attached to the grate support ring 1816, which creates opening 1740 for the grate 1420 to be inserted. The releasable/removable grate 1420 rests upon the grate support ring 1816. Grate support ring 1816 and brackets 1830 can be constructed of any suitable, durable material such as aluminum, steel or stainless steel. These may be attached by conventional fasteners, or by welding. In addition, as discussed above, charcoal igniter 1800 can be constructed with upper airflow pipes 20, as in FIG. 10, such that the airflow pipes may be used as handles for lifting the fire chamber 1802. In this manner, after the extended chimney stack 1800C has been removed, charcoal igniter 1800 fire chamber 1802 can be moved to a cooking implement so that the ignited charcoal 1810 can be deposited onto the cooking implement, as discussed earlier. It is to be further understood that charcoal igniter 1800 also includes releasable/removable grate system 1420 located in opening 1740 which allows charcoal igniter 1800 to easily and simply deposit the ignited charcoal 1810 onto the cooking implement, as discussed earner. Secondly, there is another option for discharging the ignited charcoal 1810 out the bottom of the igniter, where the design of the releasable/removable grate system 1740 and 1820 allows the entire unit to remain together and stationary as the ignited charcoal 1810 is deposited into the charcoal and ash collection pan 1805 below by removing grate 1420 with a pulling out action. In conclusion the user has options on how to discharge the charcoal: one is to leave the entire igniter 1800 in place and discharge out the bottom opening 1801A by actuating the releasable/removable grate 1420; or by removing, relocating and dumping the fire chamber 1802 with the releasable/removable grate 1420; or by removing and relocating fire chamber 1802 and discharging by tipping it over and dumping it out.

Regarding FIG. 24A, there is illustrated still another embodiment of the charcoal igniter 1900. Charcoal igniter 1900, includes, in part, upper section 1900U, lower section 1900L and extended chimney stack 1900C. With respect to lower section 1900L, as shown in FIG. 24A, lower section 1900L includes, in part, accelerator section 1901, opening 1901*a*, charcoal and ash collection pan 1905, a plurality of support legs 1906, and lower leg support 1914. It is to be understood that the various components of lower section 1900L can be constructed of any suitable, durable material such as aluminum, steel or stainless steel. It is to be further understood that the fire chamber 1902, as shown in FIG. 24A, is constructed of the same materials as the fire chamber 2 illustrated in FIG. 1. It is to be even further understood that except for the use of the extended chimney stack 1900C, as discussed below, charcoal igniter 1900 is constructed in substantially the same manner as charcoal igniter 1000 and operates in substantially the same manner as charcoal igniter 1000. It is to be understood that fire chamber 1902 may also have the upper airflow pipes 20 as in FIG. 10 igniter 1000. Although handles 1909 are shown, the upper airflow pipes 20, as in igniter 1000 in FIG. 10 can also serve as handles.

Located on top of conical top section 1903 is extended chimney stack 1900C. Extended chimney stack 1900C includes handles 1909*a*, chimney stack 1924, chimney stack openings 1924*a* and 1924*b*, and tab 1925. The purpose of extended chimney stack 1900C is to enhance the air flow draft through the utilization of a longer chimney stack 1924. It is to be understood that the components of extended chimney stack 1900C can be constructed of any suitable, durable material such as aluminum, steel or stainless steel.

Regarding FIG. 24A, extended chimney stack 1900C includes at least one strut 1922 that is conventionally attached at one end to the lower leg support 1914 by conventional fasteners. The other end of strut 1922 is conventionally removably attached to tab 1925. Tab 1925 is attached to chimney stack 1924 by conventional fasteners. The purpose of strut 1922 is to secure extended chimney stack 1900C to charcoal igniter 1900 so that extended chimney stack 1900C does not easily fall off of charcoal igniter 1900. Also, it is to be understood that extended chimney stack 1900C must be able to be easily removed from strut 1922 at tab 1925.

It is to be further understood that the other unique aspects of the charcoal igniters 100, 600 and 1000 such as the venturi effect and the ability to use the charcoal igniters 100, 600 and 1000 as a food cooker/heater can equally be applied to charcoal igniter 1900.

In particular, due to the fact that the volume within accelerator section 1901 is greater than the volume of fire chamber 1902, a net increase in the velocity of the air that passes through releasable/removable grate system 1420 and fire chamber 1902 is created when air begins to flow through charcoal igniter 1900 once the charcoal 1910 is ignited. Also, due to the fact that accelerator opening 1901*a* is larger in diameter (or cross-section) than a diameter (or cross-section) of fire chamber 1902, air velocity at releasable/removable grate system 1420 is increased. Further, due to the fact that charcoal 1910 further restricts the open passages in fire chamber 1902, the air flow increases as the air goes through the charcoal 1910 in the fire chamber 1902 on its way up and out of conical tip section opening 1903*a*. In this manner, the convective hot gases flowing upward create more airflow up through accelerator opening 1901*a*. As heat is created in fire chamber 1902, an updraft is created within fire chamber 1902. The dimensions and location of fire chamber 1902 create a restriction in the air flow which cause the air flow to accelerate even more through fire chamber 1902, and, as an alternative construction, the upper airflow pipes 20, as in FIG. 10, draw in fresh cool air, which allows the air to be distributed over substantially the entire amount of charcoal 1910 located within fire chamber 1902 thereby encouraging a quicker and more efficient complete ignition of the charcoal 1910.

Another unique aspect of the present invention is the use of fire chamber support brackets 1950, as shown in FIGS. 24B and 24C. Fire chamber support brackets 1950 include, in part, bracket base 1952, and bracket arms 1956. Bracket arms and bracket base have holes 1954 to secure it to the fire chamber 1902 and legs 1906 respectively. It is to be understood that the components of fire chamber support brackets 1950 can be constructed of any suitable, durable material such as aluminum, steel or stainless steel. In FIG. 24B, the bracket arms 1956 are welded to the bracket base 1952, and conventional fasteners are used to connect fire chamber 1902 to the bracket arms 1956. It is to be understood that all the connections could be welded, bolted or riveted.

As shown more clearly in FIGS. 24A and 24C, the leg/fire chamber bracket system 1950 is secured to each of the support legs 1906 at a location that allows the bottom of the fire chamber 1902 to be attached to bracket arms 1956 to form opening 1740. In particular, conventional fasteners are placed in openings 1954 so that each of the fire chamber bracket arms 1956 can be secured to a support leg 1906. Additionally, each support leg 1906 can be also fastened to the bracket base 1952. The unique aspect of this embodiment is that the fire chamber 1902 is rigidly attached to fire chamber support bracket arms 1956 to provide structural rigidity to charcoal igniter 1900. The grate 1420 rests near the top of bracket base 1952. The bracket arms 1956 hold up the fire chamber 1902 slightly above the bracket base 1952 just enough so there is room to slide grate 1420 in and out of the slot opening 1740. In this manner, once the charcoal 1910 has been properly ignited, the user simply removes releasable/removable grate system 1420 located in opening 1740 which allows charcoal igniter 1900 to easily and simply deposit the ignited charcoal 1901 onto the cooking implement (not shown), as discussed earlier.

Regarding FIG. 25A, there is illustrated still another embodiment of the charcoal igniter 2000. Charcoal igniter 2000, includes, in part, upper section 2000U and lower section 2000L. With respect to lower section 2000L, as shown in FIG. 25A, lower section 2000L includes, in part, opening 2002, flared accelerator section 2004, releasable grate 2006, grate actuator 2008, damper plate 2012, and damper plate actuator 2014. It is to be understood that the various components of lower section 2000L can be constructed of any suitable, durable material such as aluminum, steel or stainless steel. It is to be further understood that the refractory insert 2050, as shown in FIG. B, is constructed of a refractory (high heat) withstanding material such as a high heat concrete castable material. It may be made by pre-casting the shape indicated in FIG. 25B with a specialty concrete such as "MC-25 Plus" which is an aggregate castable product made by Harbison-Walker. It is to be even further understood that except for the use of the extended chimney stack 2024, as discussed below, charcoal igniter 2000 is constructed in substantially the same manner as charcoal igniter 1000 and operates in substantially the same manner as charcoal igniter 1000, 1700, 1800, and 1900. With the exception of the grate and damper mechanism. The pre-cast or cast in place refractory insert 2050 converts an ordinary pipe into a venturi fire chamber which is capable of high heat and extends the number of heat and cool cycles the fire chamber 2054 will stand before thermally breaking down, and thus lengthens the useful life of the product. The refractory insert 2050 may be attached to the stack 2024 with conventional fasteners (screws) through the sidewall of the stack 2024.

Upper section 2000U includes, in part, extended chimney stack 2024 and chimney stack opening 2024a The purpose of extended chimney stack 2024 is to enhance the air flow draft through the utilization of a longer chimney stack 2024. It is to be understood that the components of extended chimney stack 2024 can be constructed of any suitable, durable material such as aluminum, steel or stainless steel.

Another unique aspect of the present invention is the use of refractory insert 2050, as shown in FIG. 25B. Refractory insert 2050 includes, in part, refractory insert upper conical opening 2052, fire chamber 2054, refractory insert sleeve 2056, refractory insert lower opening 2058, refractory insert lower conical opening 2060 and refractory insert upper opening 2062. As discussed above, it is to be understood that the components of refractory insert 2050 can be constructed of a suitable refractory material such as MC-25 Plus made by Harbison-Walker company, which is a high-heat castable concrete. By definition a refractory is non-metallic material, however if an insert were desired to be made out of steel or stainless steel in the shape as shown in FIG. 25B, the present invention would function for igniting charcoal but it would not provide the insulating qualities of a refractory material. It is to be further understood that refractory insert 2050 is retained within extended chimney stack 2024 of lower section 2000L by conventional fasteners (screws). If desired, refractory insert 2050 may not be permanently attached to the inside of extended chimney stack 2024 so that refractory insert 2050 can be easily removed and replaced.

It is to be further understood that the other unique aspects of the charcoal igniters 100, 600 and 1000 such as the venturi effect; and the upper airflow pipes 20 as in FIG. 10 and used in igniters 600, 1000, and 1700 are applied to this embodiment as well for increased ignition rate. In addition the ability to use charcoal igniters 100, 600 and 1000 as a food cooker/heater can equally be applied to charcoal igniter 2000.

In particular, due to the fact that the volume within flared accelerator section 2004 is greater than the volume of fire chamber 2054, a net increase in the velocity of the air that passes through releasable grate 2006 and fire chamber 2054 is created when air begins to flow through charcoal igniter 2000 once the charcoal 2010 is ignited. Also, due to the fact that flared accelerator section opening 2002 is larger in cross-section than a cross-section of fire chamber 2054, air velocity at releasable grate 2006 is increased. Further, due to the fact that charcoal 2010 further restricts the open passages in fire chamber 2054, the air flow increases as the air goes through the charcoal 2010 in the refractory insert 2050 on its way up and out of refractory insert upper conical opening 2052. In this manner, the convective hot gases flowing upward create more airflow up through flared accelerator section 2004. As heat is created in fire chamber 2054, an updraft is created within fire chamber 2054. The dimensions and location of refractory insert 2050 create a restriction in the air flow which cause the air flow to accelerate even more through refractory insert 2050 which allows the air to be distributed over substantially the entire amount of charcoal 2010 located within refractory insert 2050 thereby encouraging a quicker and more efficient complete ignition of the charcoal 2010. Further, the upper airflow pipes 20 illustrated earlier in FIG. 10 could enter the fire chamber area (as shown with respect to igniter 1000), wherein the upper airflow pipes could be used to further accelerate burning within the refractory insert fire chamber 2054. One skilled in the art could extend the airflow pipes 20 through the wall of the stack 2024 and through the refractory insert 2050.

With respect to lower section 2000L, as discussed above, lower section 2000L includes releasable grate 2006, grate actuator 2008, damper plate 2012 and damper plate actuator 2014. A unique aspect of this embodiment is that releasable grate 2006, grate actuator 2008, damper plate 2012 and damper plate actuator 2014 allow properly ignited charcoal 2010 to be easily deposited onto the cooking implement (not shown), as discussed earner. In particular, after the charcoal 2010 has been properly ignited, the user simply has to move the grate actuator 2008 so that releasable grate 2006 is rotated downward towards accelerator section 2004. This will allow the ignited charcoal 2010 to be deposited onto the cooking implement (not shown). After the ignited charcoal 2010 has been deposited onto the cooking implement, the user then simply moves the grate actuator 2008 so that releasable grate 2006 is rotated towards refractory insert 2050. It is to be understood that the igniter 2000 can have legs conventionally attached to accelerator section 2004 to offer ground support as in other embodiments. Furthermore, igniter 2000 can be operatively attached to a pivoting extension 1760, as shown in FIG. 20.

Another unique aspect of this embodiment is the use of damper plate 2012 and damper plate actuator 2014. In particular, if there is an insufficient flow of air from accelerator section 2004 towards refractory insert 2050, the user simply moves damper plate actuator 2014 so that the volume of air between flared accelerator section 2004 and fire chamber 2054 is increased. Conversely, if there is too much flow of air from accelerator section 2004 towards refractory insert 2050, the user simply moves damper plate actuator 2014 so that the volume of air between flared accelerator section 2004 and fire chamber 2054 is decreased. The damper arrangement can be used to regulate fire heat during cooking. Also, it can be used to lengthen the shelf life of the ignited charcoal 2010 as it awaits the proper time to dump it into the cooking implement 1750.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth specifically in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein are a new and improved charcoal igniter having a venturi effect. The preferred charcoal igniter having a venturi effect, according to various embodiments of the present invention, offers the following advantages: ease of use of the charcoal igniter; excellent charcoal ignition capabilities; the ability to use the charcoal igniter as a food cooker; the ability to provide air substantially throughout the entire amount of charcoal in the igniter; lightness in weight; excellent durability; portability; the ability to dump out the ignited charcoal without having to excessively handle the charcoal igniter; the ability to move the charcoal igniter out of the way of the grilling surface after the ignited charcoal has been dumped into the grilling area; and reduced cost. In fact, in many of the preferred embodiments, these advantages of ease of use, excellent charcoal ignition capabilities, the ability to use the charcoal igniter as a food cooker, the ability to provide air substantially throughout the entire amount of charcoal in the igniter, lightness in weight, durability, portability, the ability to dump out the ignited charcoal without having to excessively handle the charcoal igniter, the ability to move the charcoal igniter out of the way of the grilling surface after the ignited charcoal has been dumped into the grilling area, and reduced cost are optimized to an extent that is considerably higher than heretofore achieved in prior, known charcoal igniters.

I claim:

1. An upper section that includes a fire chamber having a distal end and a proximal end such that a removable/releasable grate is located adjacent to the distal end of the fire chamber, wherein an amount of charcoal to be ignited is located within the fire chamber and adjacent to the releasable grate; and
   a lower section including a conical section having a distal end and a proximal end such that the proximal end of the conical section is located adjacent to the upper section and the distal end of the conical section includes a conical section opening, wherein the conical opening has a diameter that is larger than a diameter of the fire chamber; and
   wherein the upper and lower sections form a side wall at least partially containing the fire chamber, wherein there is a continuous and annular side opening located within the side wall, wherein a portion of the removable/releasable grate is located within the side opening of the charcoal igniter and food cooker; and
   wherein a plurality of brackets interconnect the distal end of the fire chamber and a top end of the lower section, wherein the upper and lower sections are spaced apart by the side opening and held in place by the brackets.

2. The charcoal igniter and food cooker, according to claim 1, wherein the plurality of support brackets is further comprised of:
   a pivoting support pivotally connected to one of the plurality of support brackets, wherein the pivoting support includes at least one support extension having a first end and a second end, wherein the first end of the pivoting support is operatively connected to one of the plurality of support brackets.

3. The charcoal igniter and food cooker, according to claim 2, wherein the pivoting support is further comprised of:
   a cooking implement having a plurality of support legs, wherein the second end of the pivoting support is operatively connected to one of the support legs.

\* \* \* \* \*